(12) United States Patent
Chen et al.

(10) Patent No.: US 11,501,041 B1
(45) Date of Patent: Nov. 15, 2022

(54) FLEXIBLE PROGRAM FUNCTIONS USABLE FOR CUSTOMIZING EXECUTION OF A SEQUENTIAL MONTE CARLO PROCESS IN RELATION TO A STATE SPACE MODEL

(71) Applicant: SAS Institute Inc., Cary, NC (US)

(72) Inventors: Xilong Chen, Chapel Hill, NC (US); Yang Zhao, Milpitas, CA (US); Sylvie T. Kabisa, Morrisville, NC (US); David Bruce Elsheimer, Clayton, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/730,476

(22) Filed: Apr. 27, 2022

Related U.S. Application Data

(60) Provisional application No. 63/181,212, filed on Apr. 28, 2021, provisional application No. 63/185,518, filed on May 7, 2021, provisional application No. 63/321,146, filed on Mar. 18, 2022, provisional application No. 63/326,779, filed on Apr. 1, 2022.

(Continued)

(51) Int. Cl.
    *G06F 30/23*     (2020.01)
    *G06F 111/10*     (2020.01)
    *G06F 30/27*     (2020.01)

(52) U.S. Cl.
    CPC .............. *G06F 30/23* (2020.01); *G06F 30/27* (2020.01); *G06F 2101/14* (2013.01); *G06F 2111/10* (2020.01)

(58) Field of Classification Search
    CPC .......... G06F 30/00; G06F 30/23; G06F 30/27; G06F 2101/14; G06F 2111/10

USPC .............................................. 703/2
See application file for complete search history.

(56) References Cited

U.S. PATENT DOCUMENTS 7,317,770 B2    1/2008   Wang
2010/0274102 A1   10/2010   Teixeira
(Continued)

OTHER PUBLICATIONS

Michaud, Nicholas et al., "Sequential Monte Carlo Methods in the Nimble R Package", Mar. 4, 2020. (Year: 2020).*

(Continued)

*Primary Examiner* — Cedric Johnson
(74) *Attorney, Agent, or Firm* — Kilpatrick Townsend & Stockton LLP

(57) ABSTRACT

One example described herein involves a system receiving task data and distribution criteria for a state space model from a client device. The task data can indicate a type of sequential Monte Carlo (SMC) task to be implemented. The distribution criteria can include an initial distribution, a transition distribution, and a measurement distribution for the state space model. The system can generate a set of program functions based on the task data and the distribution criteria. The system can then execute an SMC module to generate a distribution and a corresponding summary, where the SMC module is configured to call the set of program functions during execution of an SMC process and apply the results returned from the set of program functions in one or more subsequent steps of the SMC process. The system can then transmit an electronic communication to the client device indicating the distribution and its corresponding summary.

30 Claims, 24 Drawing Sheets

Related U.S. Application Data provisional application No. 63/328,821, filed on Apr. 8, 2022.

(56) References Cited

U.S. PATENT DOCUMENTS

| | | | | |
|---|---|---|---|---|
| 2015/0099539 | A1* | 4/2015 | Titus | H04W 64/00 |
| | | | | 455/456.1 |
| 2019/0012608 | A1* | 1/2019 | Teixeira | G06N 7/005 |
| 2021/0068683 | A1* | 3/2021 | Reich | A61M 5/142 |
| 2022/0083864 | A1 | 3/2022 | Laterre | |

OTHER PUBLICATIONS

Yu et al., "PET Image Reconstruction: GPU-Accelerated Particle Filter Framework", 2011, 18th IEEE International Conference on Image Processing, IEEE. (Year: 2011).*

Liu, Wenxia et al., "Reliability Assessment of Power Systems with Photovoltaic Power Stations Based on Intelligent State Space Reduction and Pseudo-Sequential Monte Carlo Simulation", Jun. 3, 2018, Energies, 11, MDPI. (Year: 2018).*

Cappe, Olivier et al., "An Overview of Existing Methods and Recent Advances in Sequential Monte Carlo", May 2007, Proceedings of the IEEE, vol. 95, No. 5, IEEE. (Year: 2007).*

Kantas, Nikolas et al., "On Particle Methods for Parameter Estimation in State-Space Models", 2015, Statistical Science, vol. 30, No. 3. (Year: 2015).*

N. Michaud et al., "Sequential Monte Carlo Methods in the nimble R. Package", https://arxiv.org/pdf/1703.06206.pdf, 32 pages (2020).

N. Michaud et al., "Sequential Monte Carlo Methods for 'nimble'", Package 'nimbleSMC', https://cran.r-proiect.org/web/packages/nimbleSMC/nimbleSMC.pdf, 16 pages (2021).

C. A. Naesseth et al., "Elements of Sequential Monte Carlo," Foundations and Trends in Machine Learning, 12(3), 187-306. https://doi.org/10.1561/2200000074 (2019).

Chris Paciorek, Nimble's sequential Monte Carlo (SMC) algorithms are now in the nimbleSMC package, https://r-nimble.org/nimbles-sequential-monte-carlo-smc-algorithms-are-now-in-the-nimblesmc-package, 4 pages, posted 2020.

* cited by examiner

1402

$$y_t = \beta \exp(\frac{x_t}{2})\xi_t, \quad \xi_t \stackrel{iid}{\sim} N(0,1)$$
$$x_t = \phi x_{t-1} + \gamma \eta_t, \quad \eta_t \stackrel{iid}{\sim} N(0,1), \quad \xi_t \perp \eta_t$$

1404

```
initstate x~normal(0,2);
state x~normal(x.l1*phi, sqrt(gamma_sq));
model y~normal(0, sqrt(beta_sq)*exp(x/2));
```

*name*_EVALTRAN
defines a function that returns LOGPDF of the transition distribution, $f_\theta(X_t|X_{t-rt-1}, Y_{t-rt-1}, Z_{t-zt})$.

* *Type:* FUNCTION
* *Requirement:* Required only when the APF or SIR algorithm is specified and the *name*_SAMPTRANP subroutine is specified
* *Number of arguments:* 7
* *Sequence and type of arguments:*

| | |
|---|---|
| x[*] | Input numeric array of the current state variables |
| xlag[*] | Input numeric array of the lagged state variables |
| ylag[*] | Input numeric array of the lagged dependent variables |
| z[*] | Input numeric array of the current independent variables |
| zlag[*] | Input numeric array of the lagged independent variables |
| theta[*] | Input numeric array of the parameters |
| _time | Input numeric value of the current actual time index |

1802

```
function TOY_EVALTRAN(x[*],xlag[*],ylag[*],z[*],zlag[*],theta[*],_time);
  /*Code to compute LOGPDF based on the transition distribution*/
  LOGPDF = <computed logpdf>;
  return (LOGPDF);
endsub;
```

Question: What will the processor usage be like in a cloud environment over the next one month?

Input data: Last 6 months of processor usage metrics.

Goal: Get a good-enough approximation in a reasonable amount of time

Model: Stochastic Volatility Model

Initial Distribution: $x_1 \sim N\left(0, \frac{\gamma^2}{1-\phi^2}\right)$

Transition Distribution: $x_t | x_{t-1} \sim N(\phi x_{t-1}, \gamma^2)$

Measurement Distribution: $y_t | x_t \sim N(0, b^2 \exp(x_t))$

Define in higher-level code

1904

```
initstate x~normal(0, sqrt(gamma_sq/(1-phi*phi)));
state x~normal(x_l1*phi, sqrt(gamma_sq));
model y~normal(0, sqrt(beta_sq)*exp(x/2));
```

Translate to lower-level code

1906

```
subroutine stovol_sample(x[*],xlag_*[],ylag[*],zi[*],zlag[*],
  theta[*],time);
  onLargs x, xlag;
  phi = theta[1]; gamma_sq=theta[2];
  randNumber = rand('normal');
  x[1] = sqrt(gamma_sq/(1-phi*phi)) * randNumber;
endsub;
```

```
start samptranp(y, theta, xprev, x);

alpha = theta[1];
sigma = theta[2];
eta = theta[3];

call randgen(rn,"Normal");
x = xprev[1]*alpha+sigma*rn;

return(0);
finish samptranp
```

2204

```
start samptranp(y, theta, xprev, x);
nparm = &nparm.; ndir = &ndir.;
alpha = theta[1]; sigma = theta[2]; eta = theta[3];
alpha_d = J(3,1,0); sigma_d = J(3,1,0); eta_d = J(3,1,0);
do i = 1 to ndir;
    alpha_d[i] = theta[nparm+nparm*(i-1)+1];
    sigma_d[i] = theta[nparm+nparm*(i-1)+2];
    eta_d[i] = theta[nparm+nparm*(i-1)+3];
end;
xprev_d = xprev[1+1:1+ndir];

call randgen(rn,"Normal");
x = xprev[1]*alpha+sigma*rn;
x_d = J(ndir,1,0);
do i = 1 to 3;
    x_d[i] =
xprev_d[i]*alpha+xprev[1]*alpha_d[i]+sigma_d[i]*rn;
end;
x = x // x_d;
return(0);
finish samptranp;
```

FIG. 22

FLEXIBLE PROGRAM FUNCTIONS USABLE FOR CUSTOMIZING EXECUTION OF A SEQUENTIAL MONTE CARLO PROCESS IN RELATION TO A STATE SPACE MODEL

REFERENCE TO RELATED APPLICATIONS

This claims the benefit of priority under 35 U.S.C. § 119(e) to U.S. Provisional Patent Application No. 63/181,212, filed Apr. 28, 2021; U.S. Provisional Patent Application No. 63/185,518, filed May 7, 2021; U.S. Provisional Patent Application No. 63/321,146, filed Mar. 18, 2022; U.S. Provisional Patent Application No. 63/326,779, filed Apr. 1, 2022; and U.S. Provisional Patent Application No. 63/328,821, filed Apr. 8, 2022; the entirety of each of which is hereby incorporated by reference herein.

TECHNICAL FIELD

The present disclosure relates generally to flexible program functions for invocation by computer software. More specifically, but not by way of limitation, this disclosure relates flexible program functions usable for customizing execution of a sequential Monte Carlo process in relation to a state space model.

BACKGROUND

In a variety of industries, software systems are used to analyze datasets, such as big data containing millions of data points or tens of millions of data points. The datasets can include time series data containing a sequence of data points collected over a time interval. To analyze the time series data, the software systems can use time series models. Time series models can include machine-learning models or other types of models that are configured to evaluate time series data.

Time series models can often be expressed as state space models. A state space model (SSM) is a model of a physical system as a set of input, output, and state variables related by differential equations or difference equations. The general concept behind a SSM is that there are a set of states that evolve over time, but the observations of those states contain statistical noise, and consequently the "true" states cannot be directly observed. Some goals of the SSM are to infer information about the states, future values of variables, and unknown parameters. Those inferences can be made given a set of observations, as new information arrives. Many kinds of SSMs do not have closed-form solutions. As a result, certain techniques may be used to develop numerically approximated solutions for such models.

SUMMARY

One example of the present disclosure includes a system comprising one or more processors and one or more memories including program code that is executable by the one or more processors for causing the one or more processors to perform operations. The operations can include receiving an electronic communication from a client device. The electronic communication can include task data and distribution criteria for a state space model. The task data can indicate one or more types of sequential Monte Carlo (SMC) tasks to be implemented. The distribution criteria can include an initial distribution, a transition distribution, and a measurement distribution for the state space model. The operations can include generating a set of program functions based on the task data and the distribution criteria. The set of program functions can be configured to receive arguments and return results to facilitate generation of a distribution satisfying the distribution criteria and accomplishing the one or more types of SMC tasks. The operations can include executing an SMC module to generate the distribution and a corresponding summary. The SMC module can include software instructions that are configured to call the set of program functions during execution of an SMC process and apply the results returned from the set of program functions in one or more subsequent steps of the SMC process. The operations can include transmitting another electronic communication to the client device. The other electronic communication can indicate the distribution and its corresponding summary generated in relation to accomplishing the one or more types of SMC tasks.

Another example of the present disclosure includes a non-transitory computer-readable medium comprising program code that is executable by one or more processors for causing the one or more processors to perform operations. The operations can include receiving an electronic communication from a client device. The electronic communication can include task data and distribution criteria for a state space model. The task data can indicate one or more types of sequential Monte Carlo (SMC) tasks to be implemented. The distribution criteria can include an initial distribution, a transition distribution, and a measurement distribution for the state space model. The operations can include generating a set of program functions based on the task data and the distribution criteria. The set of program functions can be configured to receive arguments and return results to facilitate generation of a distribution satisfying the distribution criteria and accomplishing the one or more types of SMC tasks. The operations can include executing an SMC module to generate the distribution and a corresponding summary. The SMC module can include software instructions that are configured to call the set of program functions during execution of an SMC process and apply the results returned from the set of program functions in one or more subsequent steps of the SMC process. The operations can include transmitting another electronic communication to the client device. The other electronic communication can indicate the distribution and its corresponding summary generated in relation to accomplishing the one or more types of SMC tasks.

Still another example of the present disclosure includes a method including receiving an electronic communication from a client device. The electronic communication can include task data and distribution criteria for a state space model. The task data can indicate one or more types of sequential Monte Carlo (SMC) tasks to be implemented. The distribution criteria can include an initial distribution, a transition distribution, and a measurement distribution for the state space model. The method can include generating a set of program functions based on the task data and the distribution criteria. The set of program functions can be configured to receive arguments and return results to facilitate generation of a distribution satisfying the distribution criteria and accomplishing the one or more types of SMC tasks. The method can include executing an SMC module to generate the distribution and a corresponding summary. The SMC module can include software instructions that are configured to call the set of program functions during execution of an SMC process and apply the results returned from the set of program functions in one or more subsequent steps of the SMC process. The method can include transmitting another electronic communication to the client device. The other electronic communication can indicate the distribution and its corresponding summary generated in relation to accomplishing the one or more types of SMC tasks. Some or all of the method can be implemented using one or more processors.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 14 shows an example of a state space model (SSM) and corresponding program code according to some aspects of the present disclosure.

FIG. 15 shows another example of a SSM and corresponding program code according to some aspects of the present disclosure.

FIG. 18 shows an example of a lower-level routine definition and an example of a corresponding code implementation according to some aspects of the present disclosure.

FIGS. 19A-B show an example of a process for converting higher-level program code into lower-level program code that is called during a sequential Monte Carlo (SMC) process according to some aspects of the present disclosure.

FIG. 22 shows an example of program code before and after introducing gradient computations according to some aspects of the present disclosure.

Figure 1:
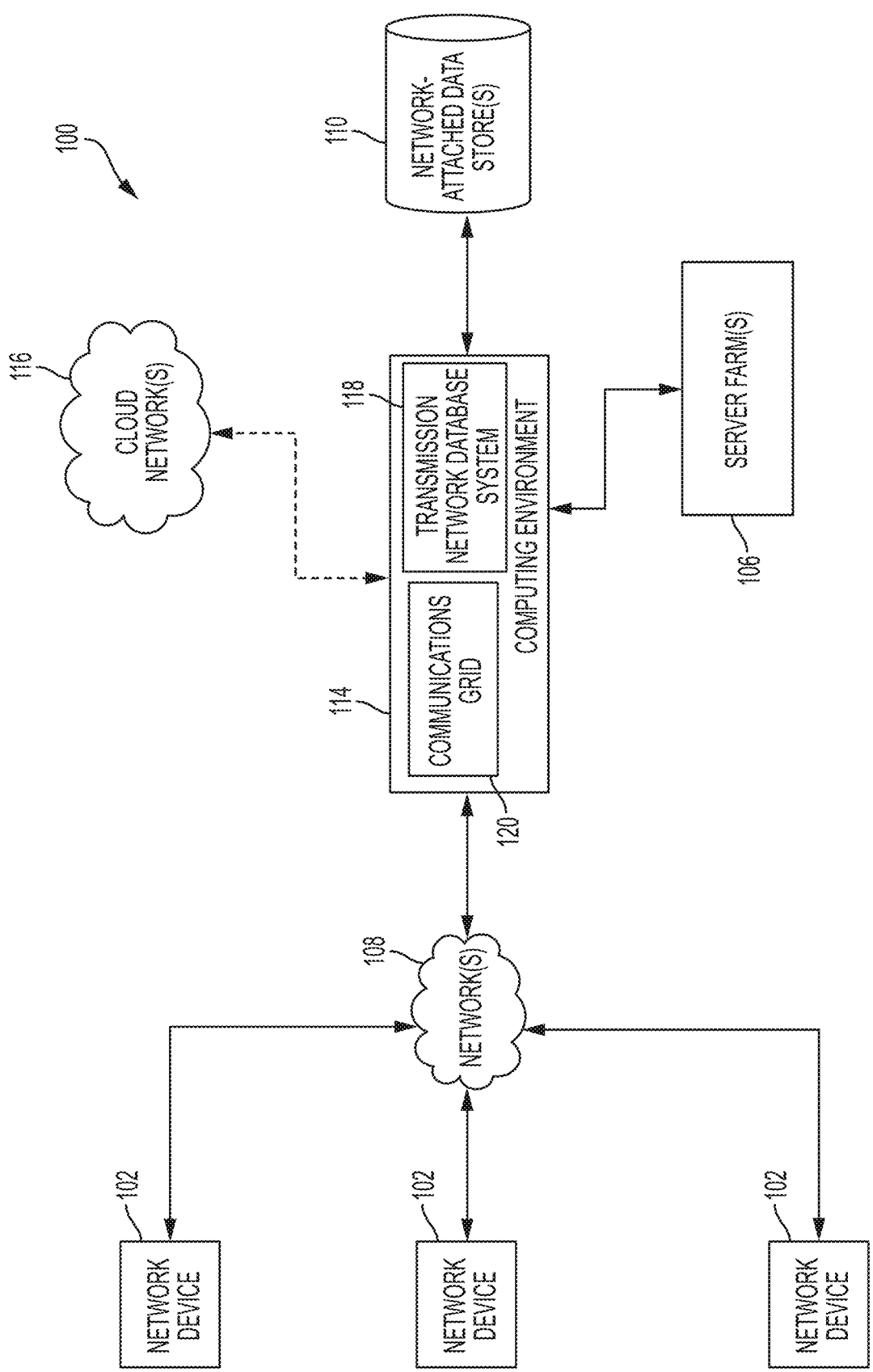
FIG. 1 shows a block diagram of an example of the hardware components of a computing system according to some aspects of the present disclosure.

In the appended figures, similar components or features can have the same reference number. Further, various components of the same type may be distinguished by following the reference number with a lowercase letter that distinguishes among the similar components. If only the first reference number is used in the specification, the description is applicable to any one of the similar components having the same first reference number irrespective of the lowercase letter.

DETAILED DESCRIPTION

Time series models may be used in a variety of industries to analyze datasets, such as big data containing millions of data points. For example, time series models may be used to perform forecasting; epi-modeling in epidemiology; automation, navigation, and object tracking in engineering; haplotype inference in bioinformatics; etc. Programming time series models can be a complex task that often requires expert knowledge, specific programming tools, and robust computer systems. For example, programming a time series model may involve drafting hundreds of lines of code in an object-oriented programming language and configuring the values for various hyperparameters and other settings, even when leveraging existing code libraries that are supposed to help simplify the process. This can make it challenging for average users with less domain-specific knowledge and fewer computing resources to create, optimize, and execute time series models. Also, many time-series models do not have closed-form solutions and therefore require use of computationally intensive techniques to generate numerically approximated solutions. One way of computing these numerically approximated solutions involves the use of a sequential Monte Carlo (SMC) process. But SMC processes are complex, may require significant configuration, and may require significant computing resources to execute. For example, within a given SMC process, there may be multiple aspects that may need to be specifically configured based on the corresponding time series model of interest. Compounding the problem is that there are many different types of time series models and many different types of SMC processes, making it challenging to identify and apply the correct SMC process to a selected model.

Some examples of the present disclosure can overcome one or more of the abovementioned problems by providing a flexible computer framework that simplifies and expedites the process of executing times series models, particularly those that leverage SMC techniques to develop numerically approximated solutions, on a computer system. The computer framework generally includes two parts. The first part is a simplified, higher-level programming language through which a user can easily define a state space model (SSM) representation of a time series model. This leverages the fact that many time series models can be represented as SSMs, making it significantly easier for a user to define a time series model than may be possible using conventional approaches—e.g., programming a time series model itself. The second part of the computer framework is an engine that can translate the higher-level SSM definitions into lower-level routines. The lower-level routines can be easily "plugged in" (e.g., called or invoked) during execution of an SMC process to customize said execution. For example, a user can draft higher-level program code defining a SSM using the higher-level programming language, which can be user friendly and have a simplified set of commands. This may allow non-technical users to more easily define SMMs. The user can then transmit the higher-level program code to a server system, which can execute an engine to translate the higher-level program code into lower-level routines. After translating the higher-level program code into the lower-level routines, the server system can execute the lower-level routines at appropriate times during an SMC process to facilitate computation of the SMC results (e.g., a sample distribution and a corresponding summary). For example, during the execution of the SMC process, the server system may issue calls to an application programming interface to invoke the lower-level routines. In response to the calls, the lower-level routines may execute and return results back to the SMC process via the application programming interface. By invoking the lower-level routines, the execution of the SMC process may be altered (transparently to the user) and a level of customizability may be achieved. In this way, the computer framework provide a user friendly, customizable, modular, and extensible system that allows both advanced and novice users to easily execute SMC processes in relation to their state space models.

As noted above, in some examples the user can define a SSM representation of a time series model using a higher-level programming language, which may have a simplified set of commands provided in a development environment. Alternatively, the user can define a SSM representation of a time series model directly using the lower-level routines, rather than in the higher-level programming language. The user can then submit the lower-level routines to the server system. Since the lower-level routines are already compatible with the API and ready for execution, the server system may not need to perform the translation described above. This option may be better suited to more advanced users.

In some examples, the server system can execute two or more aspects of the SMC process in parallel. For example, the server system can select an SMC process based on task data or other information supplied by the user. The SMC process can be one of many types of SMC processes capable of being implemented by the server system, where the different types of SMC processes may be more or less optimal for different types of SSMs. After selecting the appropriate SMC process to execute, the server system may determine that two or more computer operations associated with the SMC process can be executed in parallel. Based on this determination, the server system can schedule those computer operations for parallel execution, for example on two or more nodes or processing threads of the server system. Executing the operations in parallel may significantly reduce the amount of time it takes to execute the SMC process and thereby generate results.

In some examples, the server system can implement one or more optimization routines to enhance the speed at which an SMC process is executed, improve the results of the SMC process, and reduce consumption of computing resources. For example, the SMC modules can be configured to execute an automatic differentiation technique, such as a forward automatic differentiation technique. Automatic differentiation is a technique used to evaluate the derivative of a function specified by a computer program. The automatic differentiation technique can involve repeatedly applying the chain rule to elementary arithmetic operations and elementary functions to compute derivatives automatically. Using the automatic differentiation technique, the server system can determine and apply gradients to dramatically reduce the amount of computations that are required to complete the SMC process, for example by allowing the SMC process to converge on a solution significantly faster than would otherwise be possible. This, in turn, can conserve a large amount of computing resources (e.g., processing power, memory, and storage).

One specific example can arise in the context of epi-modeling. A user may wish to estimate the time varying, instantaneous reproduction number of infections for a virus in a particular location, such as a particular country or state. To do so, the user may formulate a Susceptible-Exposed-Infected-Recovered (SEIR) model, which is a type of state space model. The user can then use the higher-level programming language to easily define the state space model as a set of higher-level program code, which the user can then transmit to the server system. The server system can translate the higher-level program code into lower-level routines and then execute the lower-level routines at appropriate times during an SMC process to generate results. In this case, the results may include estimates of a daily-varying reproduction number for the virus epidemic in that particular location, for example on the basis of daily hospitalization and positive test incidents.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-12 depict examples of systems and methods usable for generating program functions and customizing execution of an SMC process according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in generating program functions and customizing execution of an SMC process, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for use in generating program functions and customizing execution of an SMC process to a network-attached data store 110 for storage. The computing environment 114 may later retrieve the data from the network-attached data store 110 and use the data to generate program functions and customize execution of an SMC process.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the server farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for generating program functions and customizing execution of an SMC process.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for generating program functions and customizing execution of an SMC process. For example, the computing environment 114, a network device 102, or both can implement one or more versions of the processes discussed with respect to any of the figures.

Figure 2:
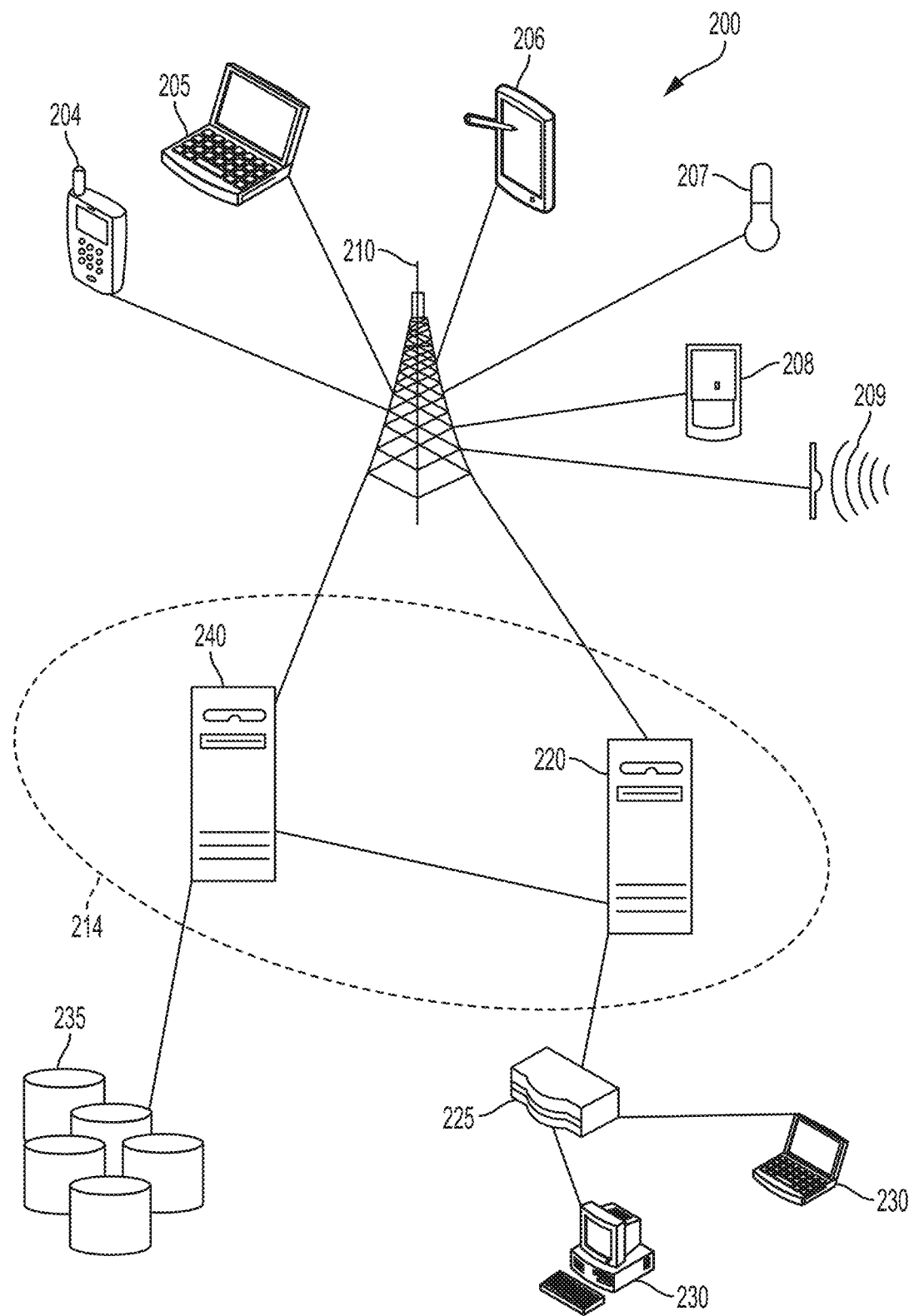
FIG. 2 shows an example of devices that can communicate with each other over an exchange system and via a network according to some aspects of the present disclosure.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing.

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project involve executing a state space model in relation to data, the computing environment 214 can perform a pre-analysis of the data. The pre-analysis can include determining whether the data is in a correct format for use with the model and, if not, reformatting the data into the correct format.

Figure 3:
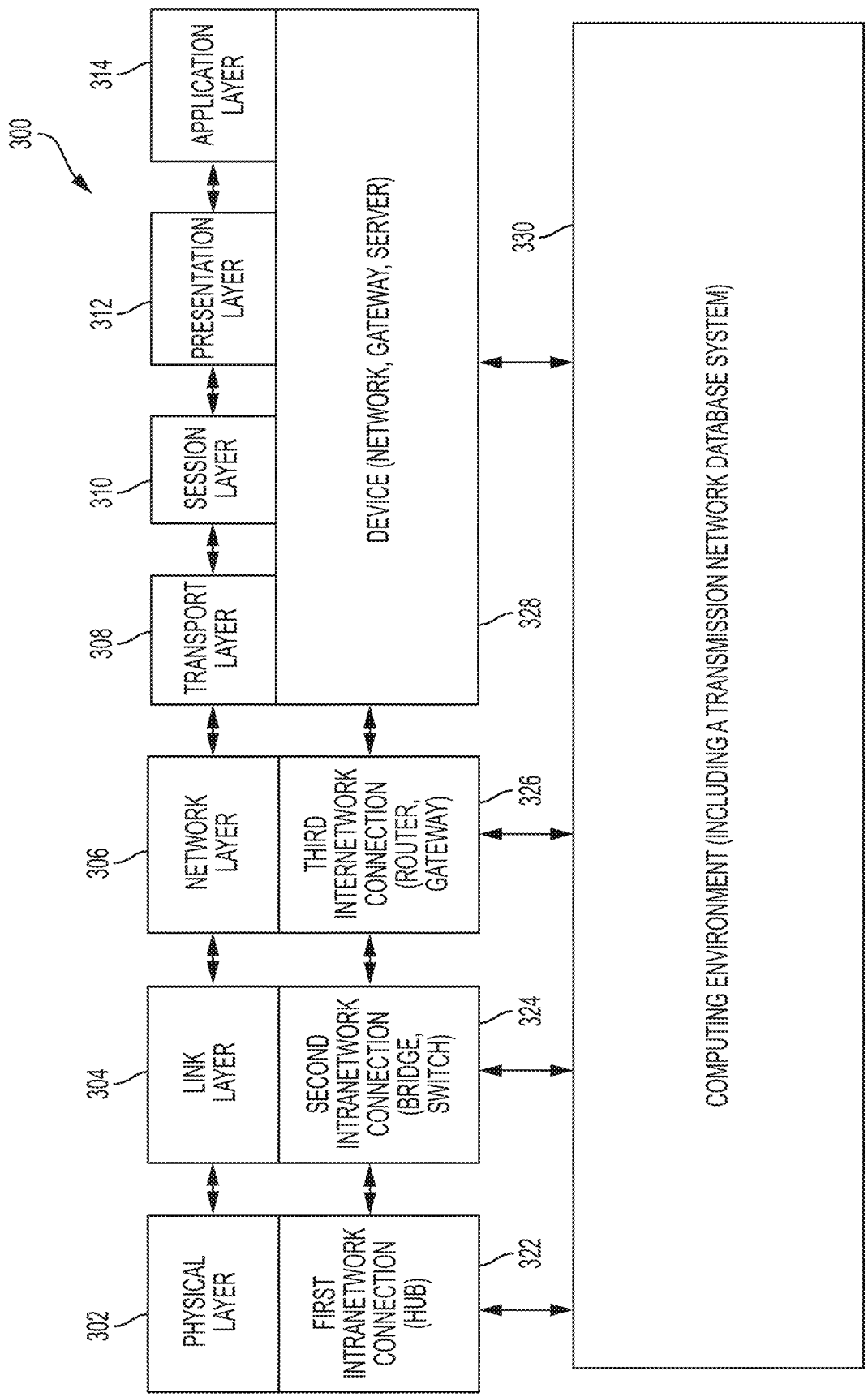
FIG. 3 shows a block diagram of a model of an example of a communications protocol system according to some aspects of the present disclosure.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for generating program functions and customizing execution of an SMC process, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be used in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for executing an SMC process.

Figure 4:
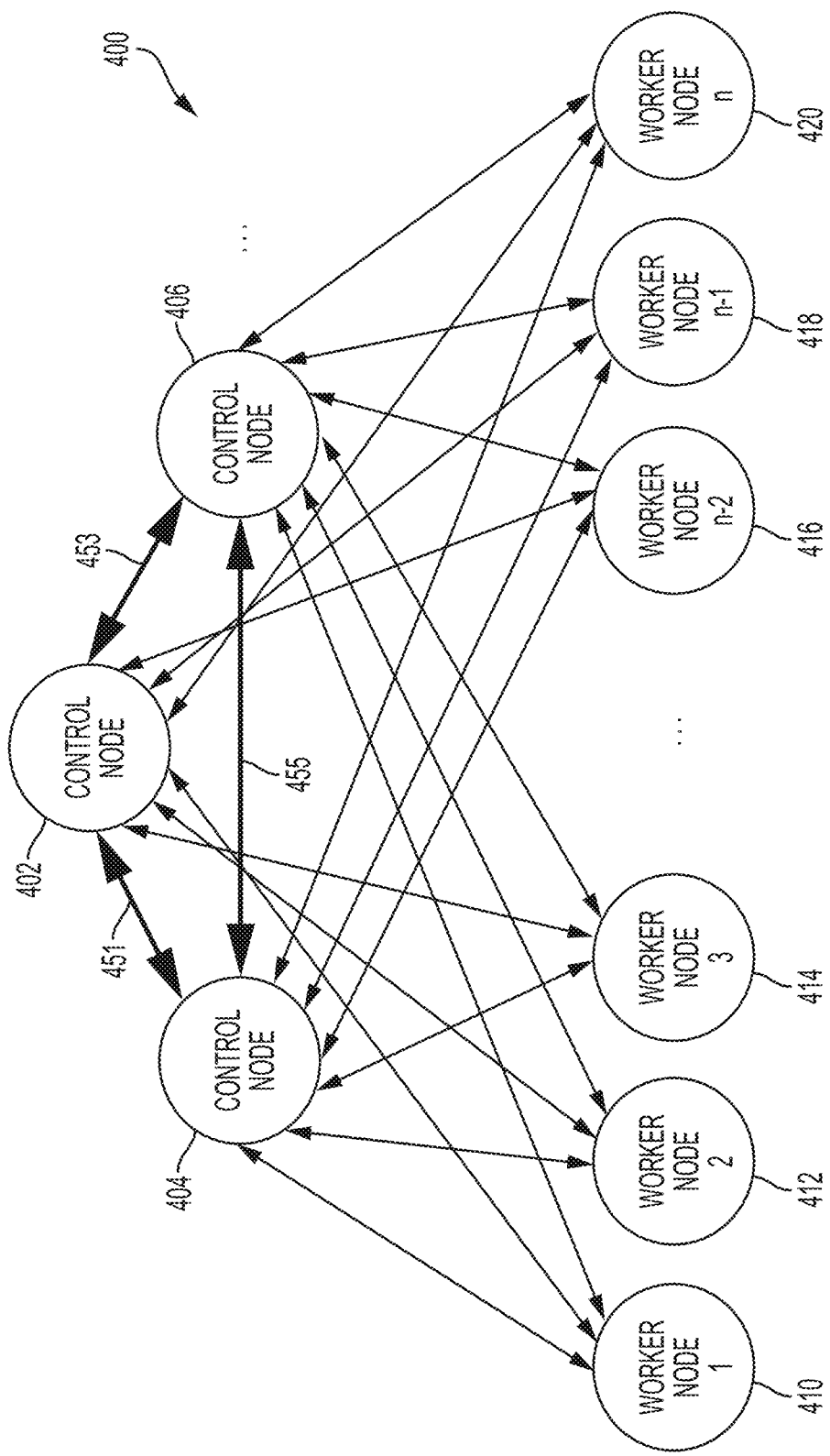
FIG. 4 shows a hierarchical diagram of an example of a communications grid computing system including a variety of control and worker nodes according to some aspects of the present disclosure.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to an SMC process. The project may include the data set. The data set may be of any size and can include a time series. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project involving execution of an SMC process in relation to a state space model can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may execute a portion of an SMC process using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used in generating program functions and customizing execution of an SMC process.

Figure 5:
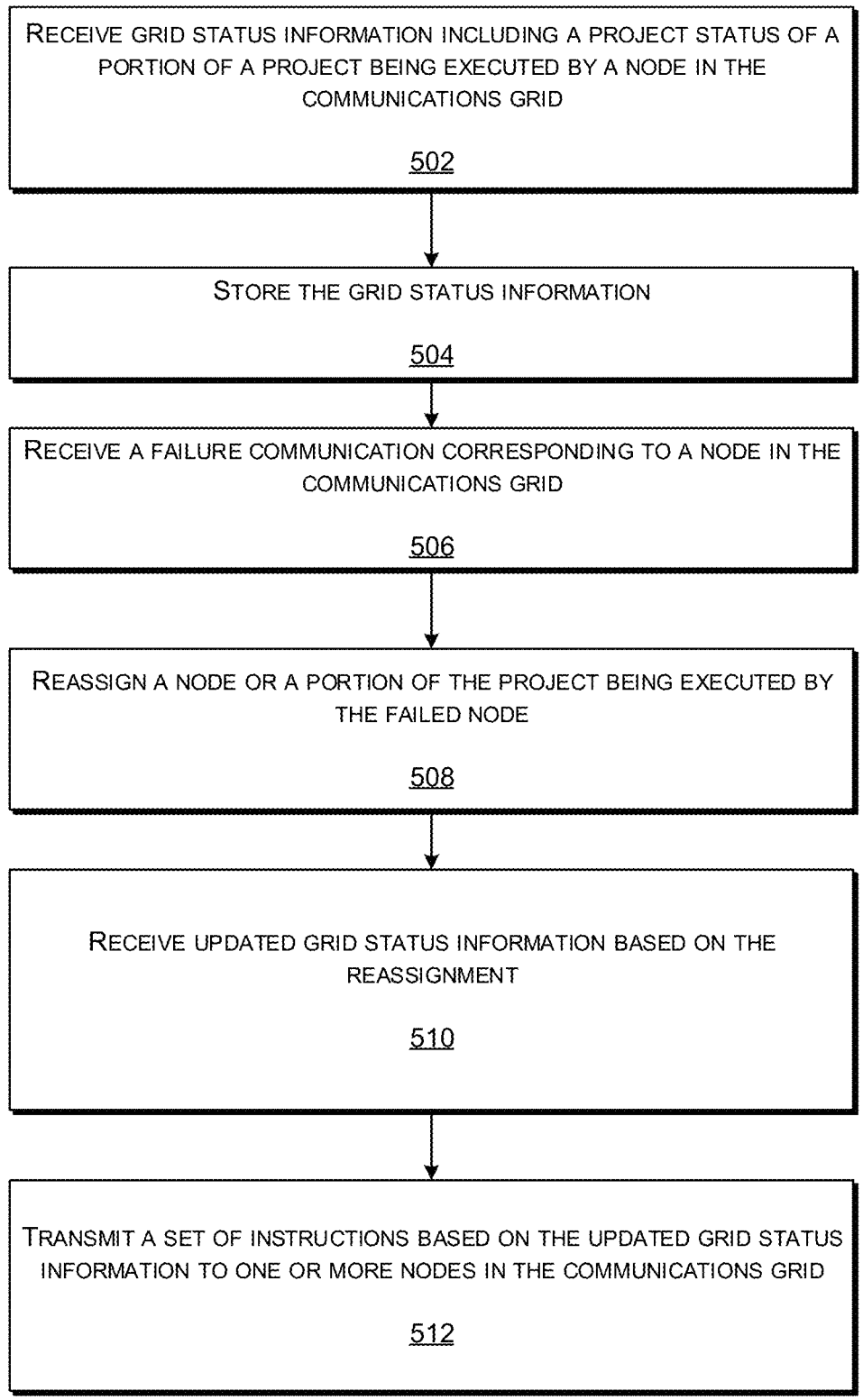
FIG. 5 shows a flow chart of an example of a process for adjusting a communications grid or a work project in a communications grid after a failure of a node according to some aspects of the present disclosure.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
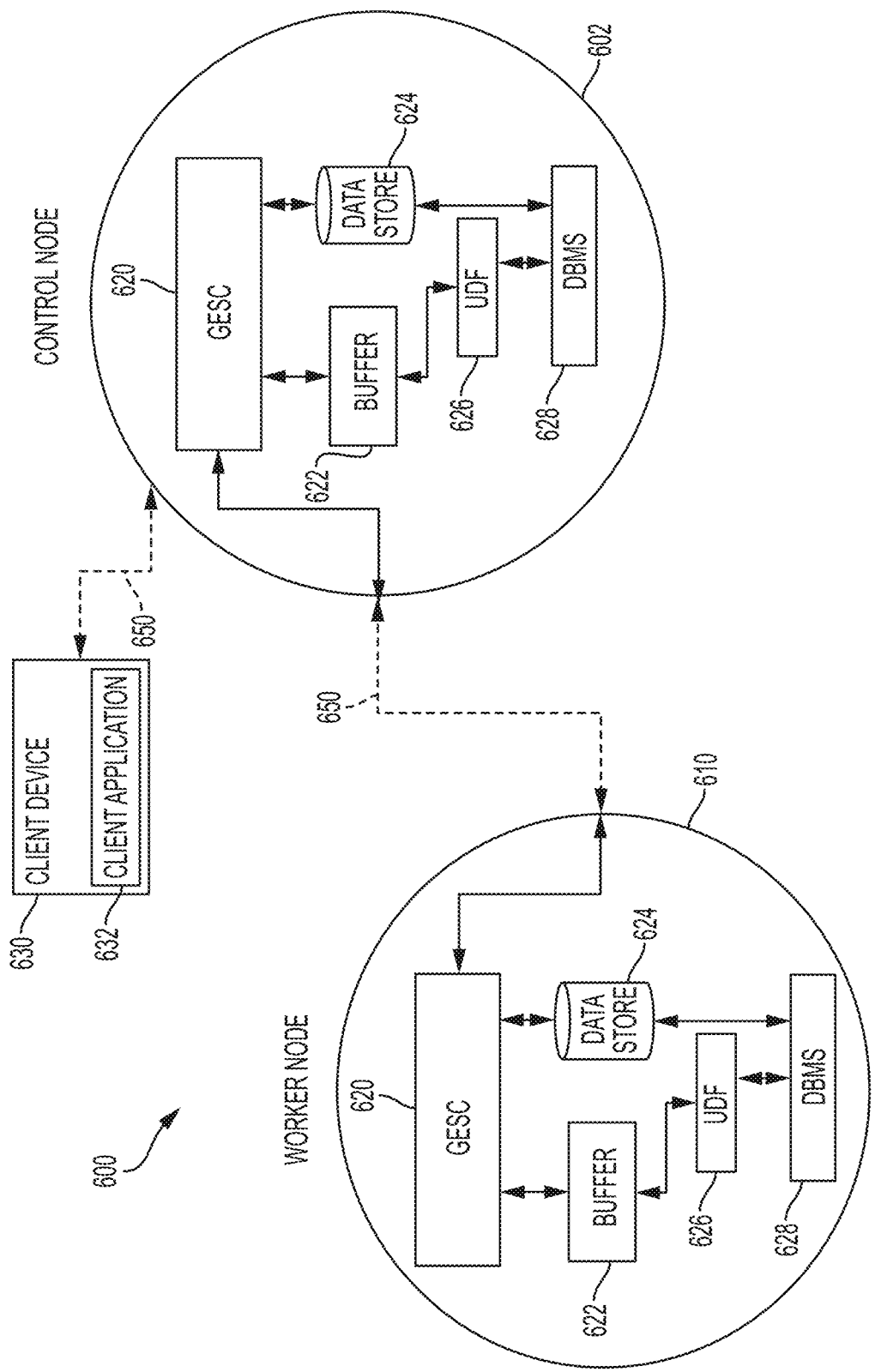
FIG. 6 shows a block diagram of a portion of a communications grid computing system including a control node and a worker node according to some aspects of the present disclosure.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
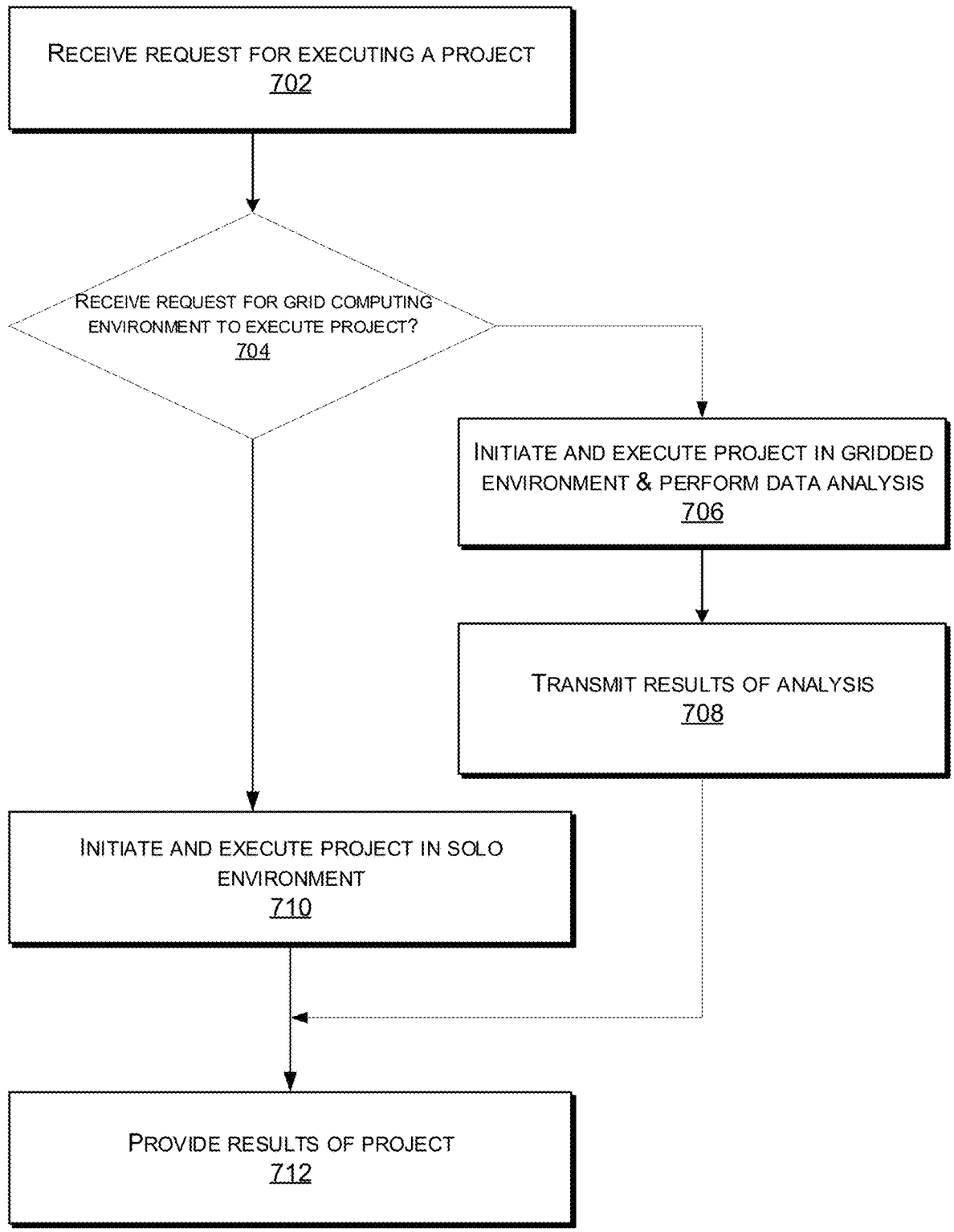
FIG. 7 shows a flow chart of an example of a process for executing a data analysis or processing project according to some aspects of the present disclosure.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
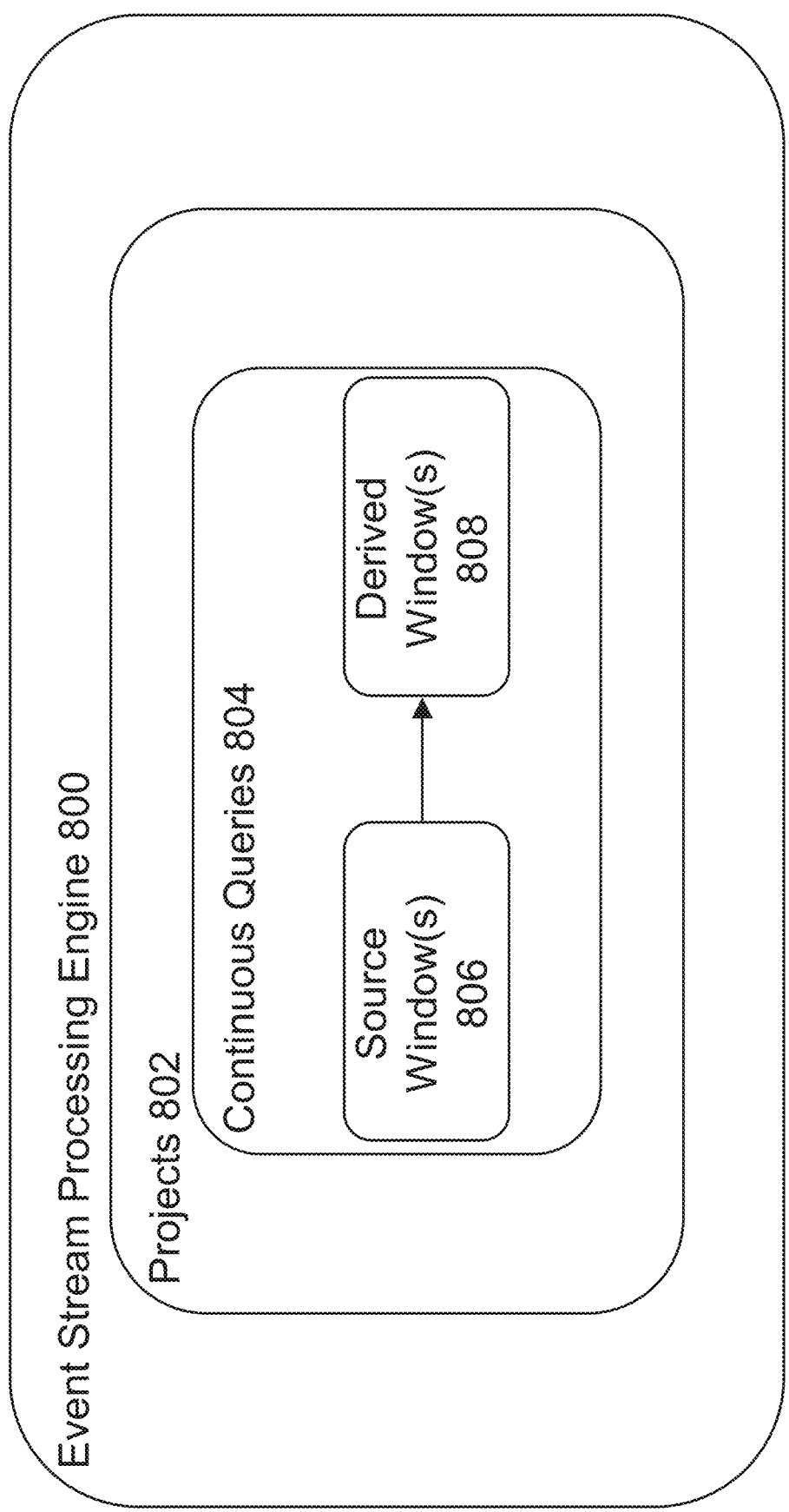
FIG. 8 shows a block diagram including components of an Event Stream Processing Engine (ESPE) according to some aspects of the present disclosure.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
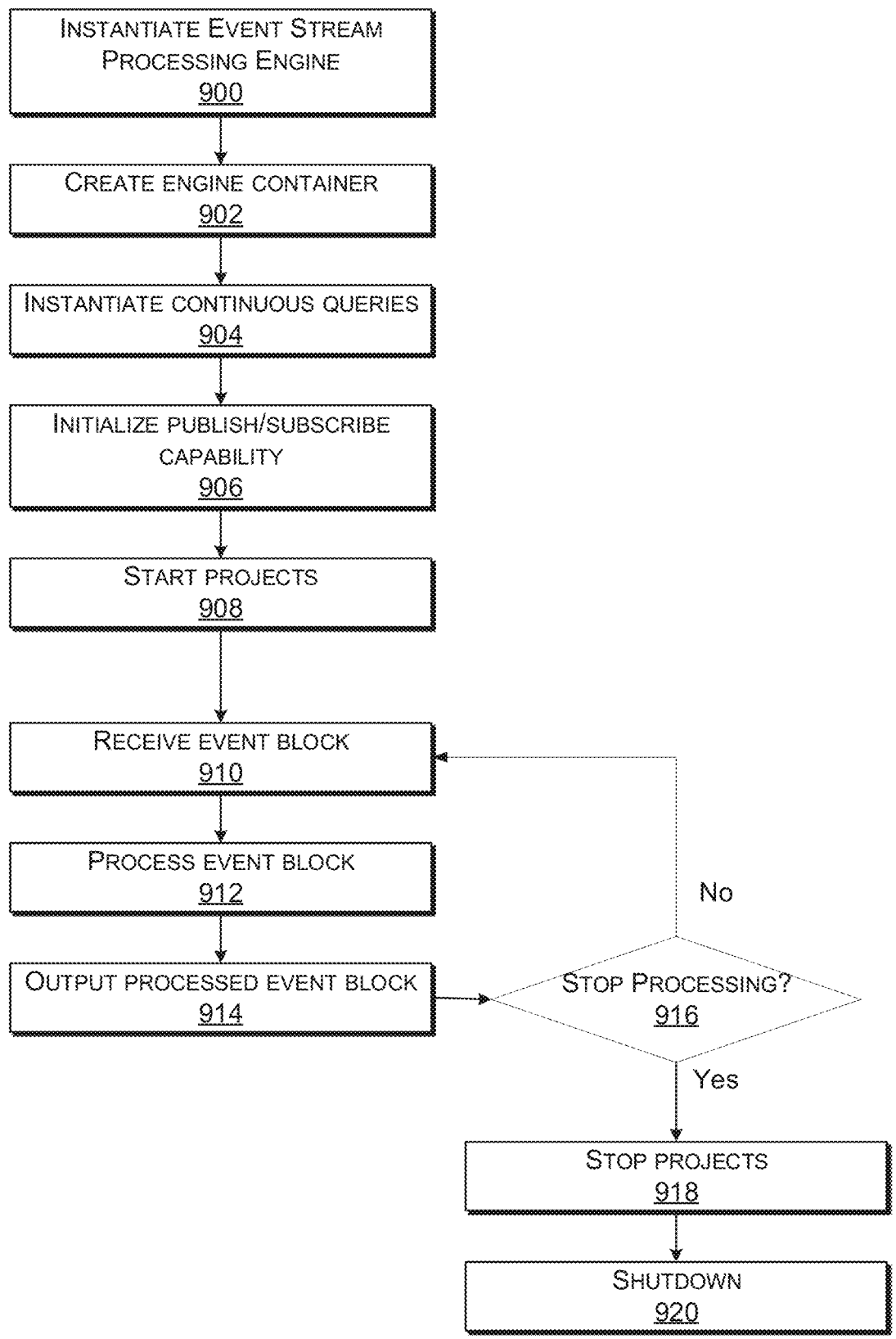
FIG. 9 shows a flow chart of an example of a process including operations performed by an event stream processing engine according to some aspects of the present disclosure.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
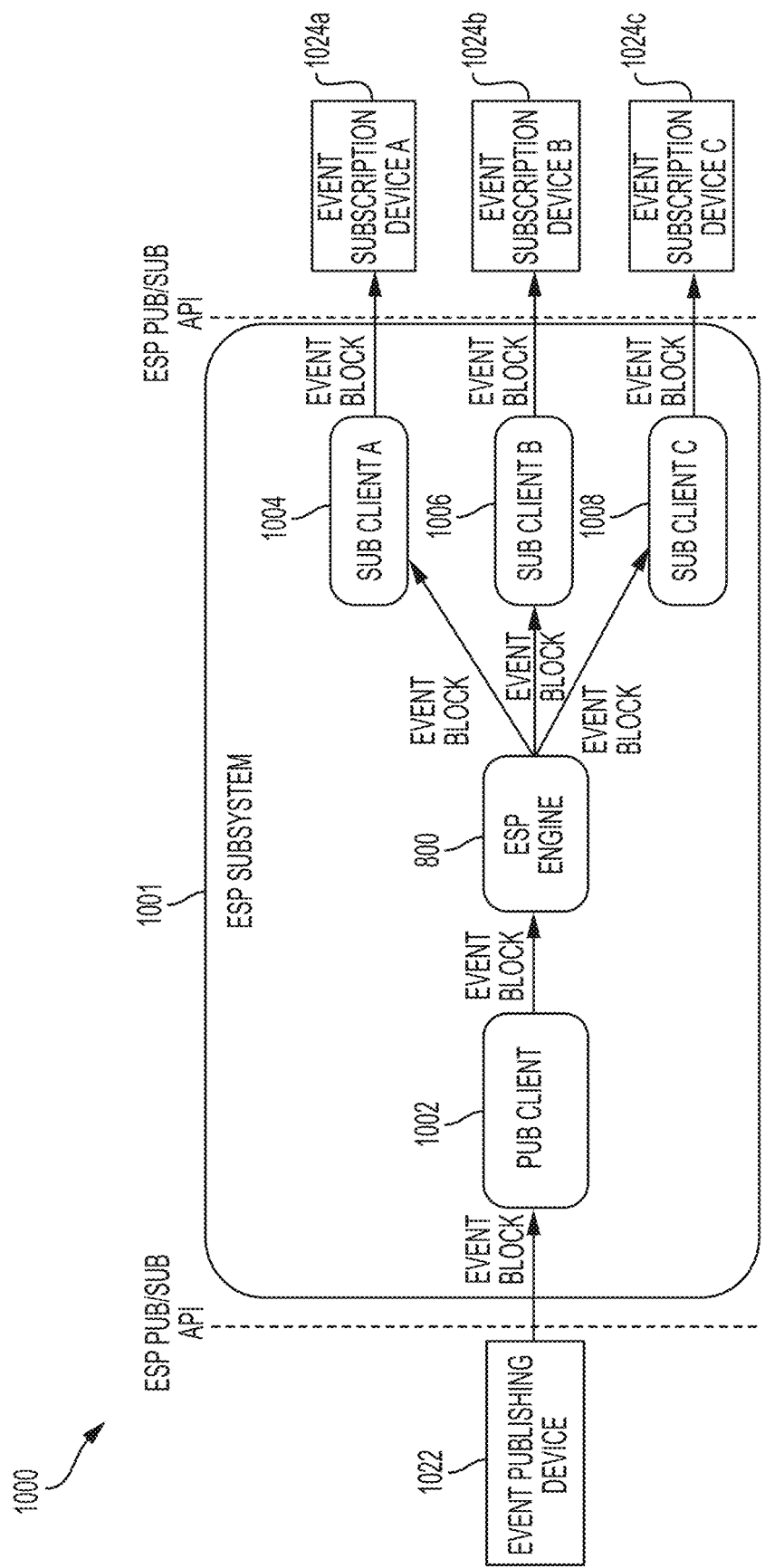
FIG. 10 shows a block diagram of an ESP system interfacing between a publishing device and multiple event subscribing devices according to some aspects of the present disclosure.

FIG. 10 is a block diagram of an ESP system 1000 interfacing between publishing device 1022 and event subscription devices 1024a-c according to some aspects. ESP system 1000 may include ESP subsystem 1001, publishing device 1022, an event subscription device A 1024a, an event subscription device B 1024b, and an event subscription device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024a, event subscription device B 1024b, and event subscription device C 1024c. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024a, event subscription device B 1024b, and event subscription device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024a, event subscription device B 1024b, and event subscription device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024a using the publish/subscribe API. Subscribing client B 1006 may be started by an event subscription application B executing at event subscription device B 1024*b* using the publish/subscribe API. Subscribing client C 1008 may be started by an event subscription application C executing at event subscription device C 1024*c* using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
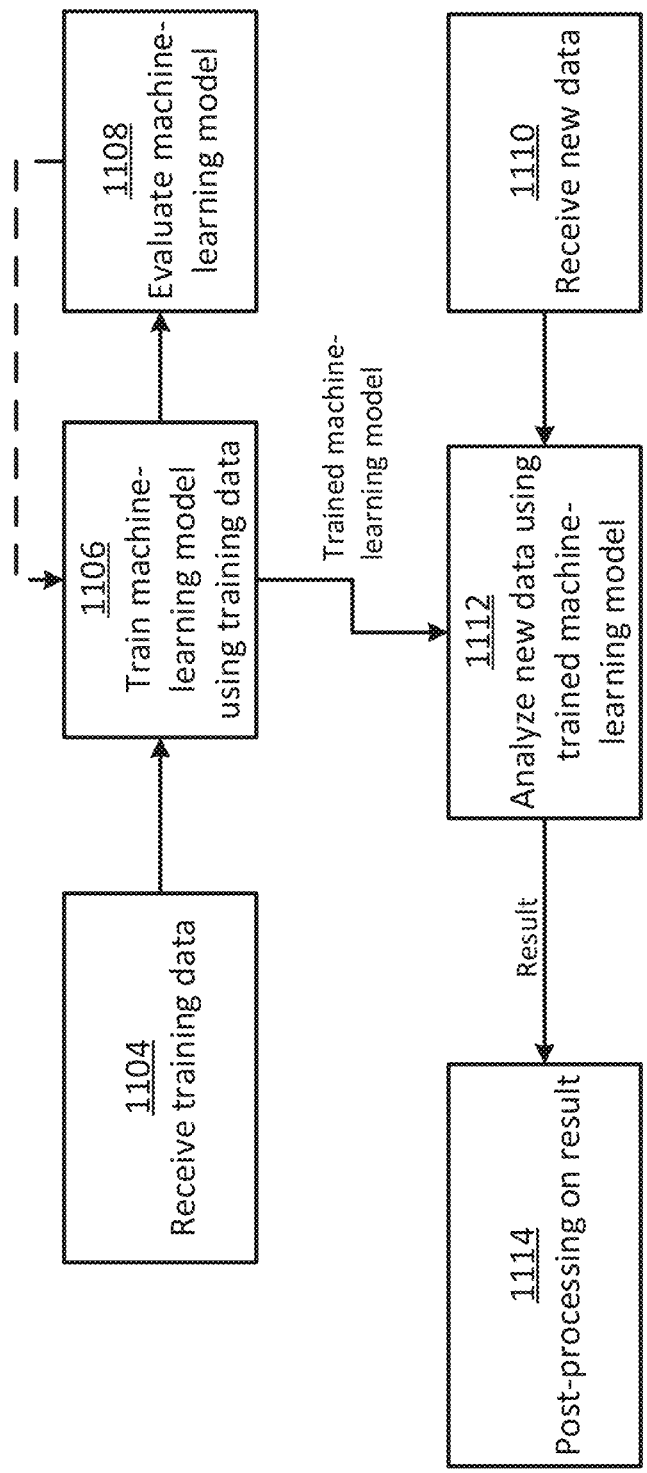
FIG. 11 shows a flow chart of an example of a process for generating and using a machine-learning model according to some aspects of the present disclosure.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and using machine-learning models can include SAS Enterprise Miner (e.g., with the SAS Text Miner add-on), SAS Rapid Predictive Modeler, SAS Model Manager, SAS Cloud Analytic Services (CAS), and SAS Viya (e.g., including Visual Text Analytics and Visual Analytics), all of which are by SAS Institute Inc.® of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. An evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
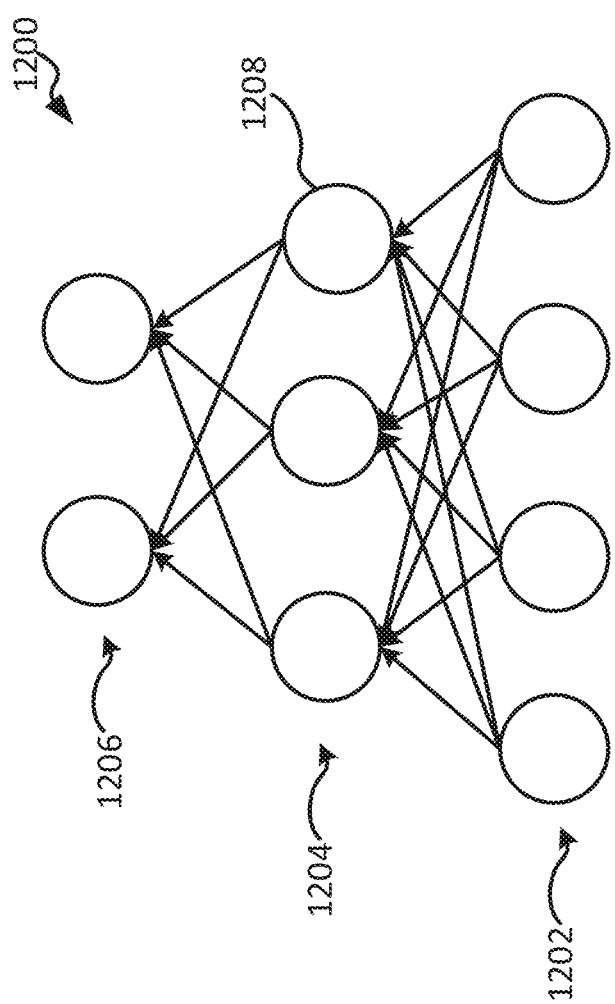
FIG. 12 shows a node-link diagram of an example of a neural network according to some aspects of the present disclosure.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and quickly executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing.

Figure 13:
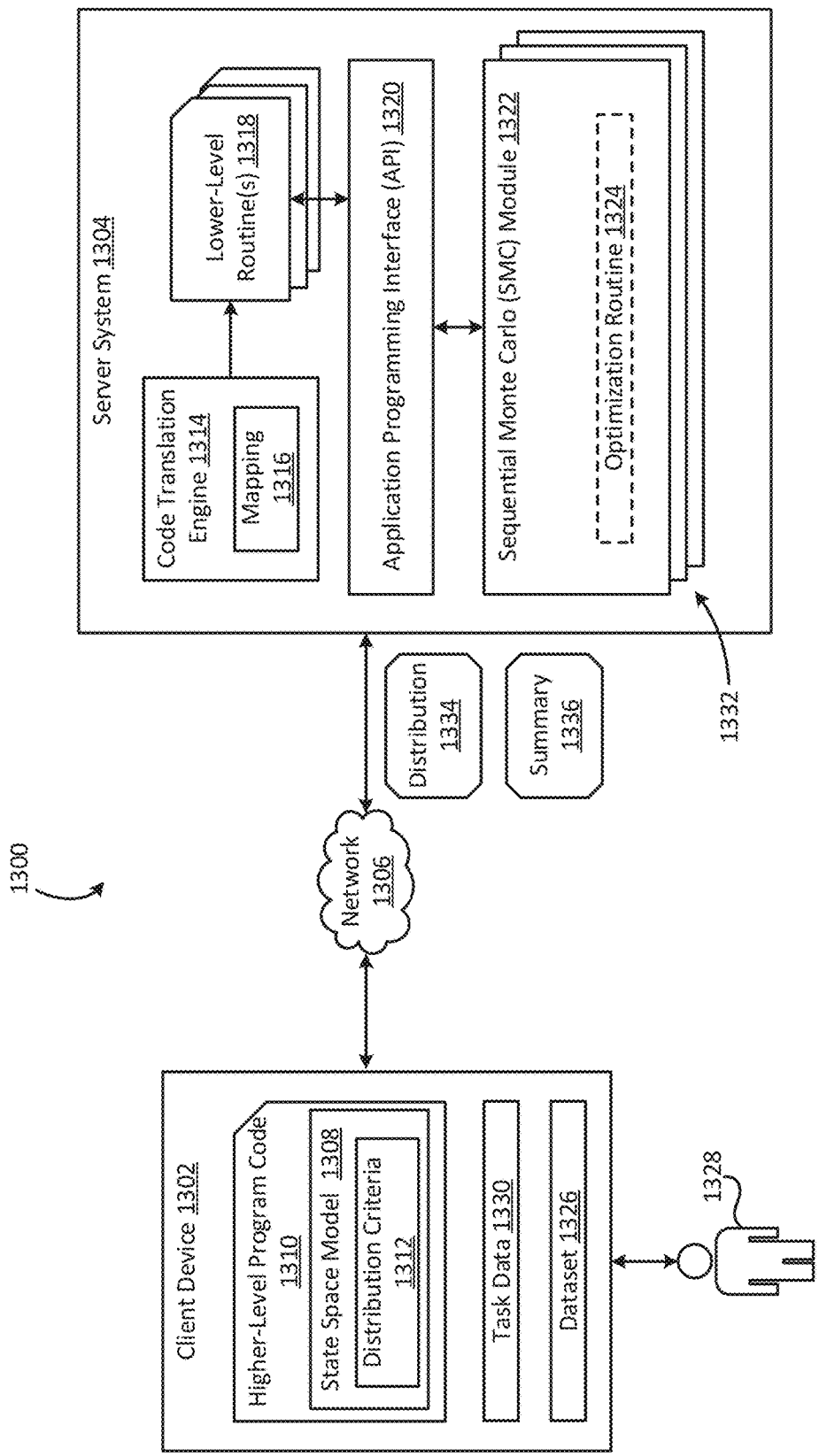
FIG. 13 shows a block diagram of an example of a system for implementing some aspects of the present disclosure.

FIG. 13 shows a block diagram of an example of a system 1300 for employing flexible program functions for customizing execution of a sequential Monte Carlo (SMC) process according to some aspects. The system 1300 includes a client device 1302, such as a laptop computer, desktop computer, mobile phone, tablet, e-reader, or wearable device. A user 1328 of the client device 1302 may wish to perform an analysis of a dataset 1326. The dataset 1326 can be a historical dataset that includes time series data spanning a prior timespan. For example, the dataset 1326 may include processor-consumption metrics indicating processor consumption in a cloud computing environment over a prior timespan, network-traffic metrics indicating bandwidth consumption in a network environment over a prior timespan, or product-sales metrics indicating sales of a product over a prior timespan. The goal of the user 1328 may be, for example, to generate a predictive forecast for a future timespan based on the dataset 1326. Of course, the user 1328 may have other goals in other examples.

To analyze the dataset 1326, the user 1328 may wish to use a model. Since the dataset 1326 is a time series dataset, the user 1328 may wish to apply a time series model to analyze the dataset 1326. Examples of such time series models can include stochastic volatility models, Bayesian time-series models, autoregressive integrating moving average (ARIMA) models, and exponential smoothing models. Many time series models can be represented as state space models (SSMs). A SSM can be expressed using three distributions: an initial distribution $x_1 \sim h_\theta(.)$, a transition distribution $x_t | x_{t-1} \sim f_\theta(.)$, and a measurement distribution $y_t | x_t \sim g_\theta(.)$. In these distributions, $\theta$ is the parameter vector; $y_t$ is the observed dependent variable at time t; $x_t$ is the (unobserved) state variable at time t; the $h_\theta(.)$, $f_\theta(.)$, and $g_\theta(.)$ are the distributions. This three-distribution expression of SSMs is very abstract: the $\theta$, $y_t$, and $x_t$ might be vectors of any size, and any kind of suitable distributions and linear/nonlinear relationships might be involved. That is why SSMs can represent almost any kind of time series model, and why many SSMs have no closed-form likelihood equations. Because many SSMs have no closed-form solutions, various methods may be employed to develop numerically approximate solutions for the SSMs.

One technique that can be used to compute a numerically approximate solution for a SSM is a SMC process. The SMC process approximates a distribution through so-called particles, $$\{x_t^{(i)}, w_t^{(i)}\}_{t=1,\ldots,T}^{i=1,\ldots,N},$$

where $\{x_t^{(i)}, w_t^{(i)}\}$ is the ith particle, $x_t^{(i)}$ is the ith simulated value of state variable $x_t$, $w_t^{(i)}$ is the corresponding weight for $x_t^{(i)}$, N is the number of particles and T is the sample size. Through such an approximation, the SMC process can iteratively propagate $p(x_{t-1}|y_{1:t-1}) \to p(x_t|y_{1:t-1})$ and update $p(x_t|y_{1:t-1}) \to p(x_t|y_{1:t})$ by sampling, evaluation, and re-sampling.

For a SSM, there are generally five types of problems that may be solved by employing SMC processes. They include learning (the estimation of the unknown parameters), evaluating (the likelihood), filtering (the state variable's distribution at time t, given t observations), smoothing (the state variable's distribution at time t, given T observations), and forecasting (the future distribution of dependent variables and state variables). SMC processes can help solve these problems. In the example described above, the user 1328 may wish to solve a forecasting problem—e.g., to generate a predictive forecast using the dataset 1326.

In many cases, it is not straightforward to apply SMC to solve a given problem in relation to a state space model. There are many different types of state space models, each of which may have unique parameters and configurations. There are also many different types of SMC processes, each of which may have unique parameters and configurations. Examples of such SMC processes can include filtering algorithms such as Auxiliary Particle Filter (APF), Fully Adapted Auxiliary Particle Filter (FA-APF), Sequential Importance Resampling (SIR), and Bootstrap Filter (BF); forecasting and evaluating algorithms that use some specific filtering algorithms; smoothing algorithms such as Fixed-Lag Smoothing, and Fixed-Interval Smoothing with some specific filtering algorithms; learning algorithms such as Particle Markov Chain Monte Carlo (PMCMC) with some specific evaluating algorithms and MCMC algorithms. Applying the correct SMC process to a given state space model, in the correct way, can require a deep understanding of both SMC processes and state space models that may be beyond the experience level of an ordinary user. SMC processes can also be highly complex and require a significant amount of computing resources (e.g., processing power, memory, and storage) deployed in the right way to achieve results quickly and accurately. For example, using an SMC process to solve a learning problem can require a significant amount of computation, which can involve a correspondingly large amount of computing power and take a relatively long time to complete. As a result, it can be challenging to develop a computer system that is flexible enough to allow a user to operate on any SSM of interest using any type of SMC process, user-friendly enough to allow the user to focus on the model specification and parameter tuning without needing to understand the details of how the SMC process are implemented, and efficient enough so that users can obtain reliable estimated parameters and inference results in a reasonable time.

Some examples of the present disclosure provide a holistic computing framework to enable a user 1328 to apply SMC processes to state space models in a flexible, intuitive, and efficient manner. The computing framework can employ application programming interfaces (APIs), translations between multiple programming languages, specialized program functions, optimization routines 1324, and parallel processing to achieve accurate results quickly.

More specifically, in some examples the user 1328 can identify a state space model 1308 that represents a time series model of interest. The state space model 1308 may be defined using certain distribution criteria 1312. The distribution criteria 1312 can characterize the initial distribution, transition distribution, and/or measurement distribution of the state space model 1308. Having identified the appropriate state space model 1308, the user 1328 can draft a set of program code (e.g., in a development environment) that includes program instructions defining the state space model 1308. The program code may be higher-level program code 1310 that is drafted using a higher-level programming language. The higher-level programming language may be proprietary and designed to simplify the process of defining state space models. For example, this language may have a special, user-friendly syntax and built-in commands designed to make it relatively simple for non-technical users to draft the higher-level program code 1310.

Once the user 1328 has drafted the higher-level program code 1310, the user 1328 can operate the client device 1302 to submit the higher-level program code 1310 to a server system 1304 containing one or more servers (e.g., backend servers). This can involve the client device 1302 transmitting the higher-level program code 1310 defining the distribution criteria 1312 over a network 1306, such as a local area network or the Internet, to the server system 1304. The client device 1302 may also transmit task data 1330 to the server system 1304. The task data 1330 can indicate the type of problem (e.g., learning, filtering, smoothing, evaluating, or forecasting) to be solved by executing an SMC process in relation to the state space model 1308. For example, the task data 1330 can indicate that the server system 1304 is to perform a learning task, a filtering task, a smoothing task, an evaluation task, a forecasting task, or any combination of these, with respect to the state space model 1308. The task data 1330 may be generated based on user inputs from the user 1328.

Figure 15:
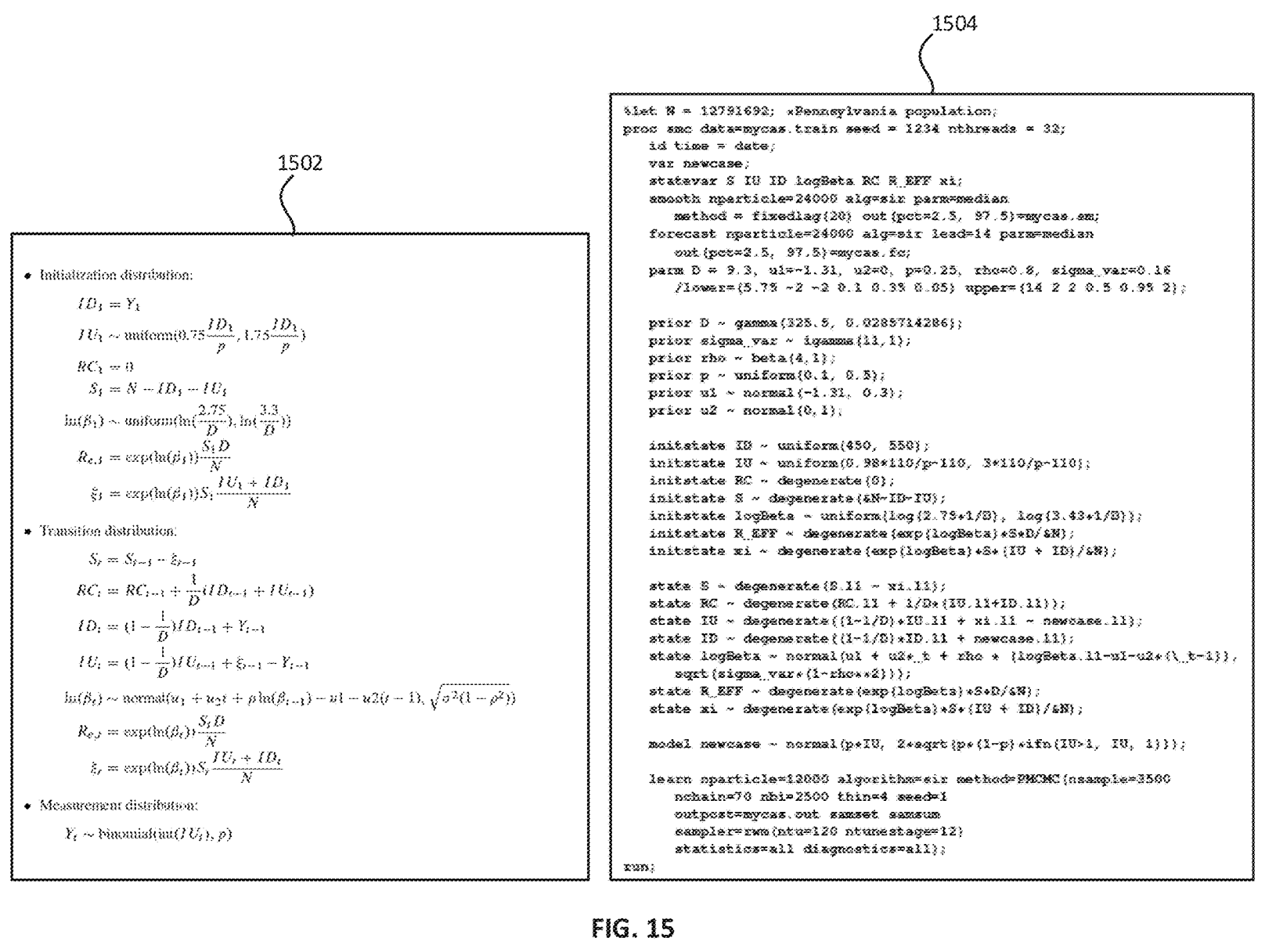

One example of the higher-level program code 1310 described above is shown in FIG. 14. In this example, the state space model 1402 is shown on the left. The state space model 1402 includes various distribution criteria and other parameters. The distribution criteria and other parameters for the state space model 1402 can be represented in the higher-level program code 1404 shown on the right. Another example is shown in FIG. 15. In this example, the state space model 1502 is shown on the left. This state space model 1502 is significantly more complex than the state space model 1402 of FIG. 14. The distribution criteria and other parameters for the state space model 1502 can be represented in the higher-level program code 1504 shown on the right.

Continuing with FIG. 13, the server system 1304 can receive the higher-level program code 1310 with the distribution criteria 1312. The server system 1304 can also receive the task data 1330. In some examples, the server system 1304 can then translate the higher-level program code 1310 into one or more lower-level routines 1318. A lower-level routine can be a program function defined using a lower-level programming language as compared to the higher-level programming language. Examples of the lower-level programming language can include Python, C, C++, and Java. In some examples, the server system 1304 may translate the higher-level program code 1310 into one or more intermediate-level routines, before translating the intermediate-level routines into the lower-level routines. An intermediate-level routine can be a program function defined using an intermediate-level programming language that is lower level than the higher-level programming language and higher level than the lower-level programming language. One example of an intermediate-level programming language can include the FCMP language by SAS Institute of Cary, N.C. ("SAS"). The SAS® FCMP language is designed for modularity and simplicity and supported in the SAS® system, for example, in the FCMP procedures (SAS® Function Compiler procedure) or the FCMP action set.

Figure 16:
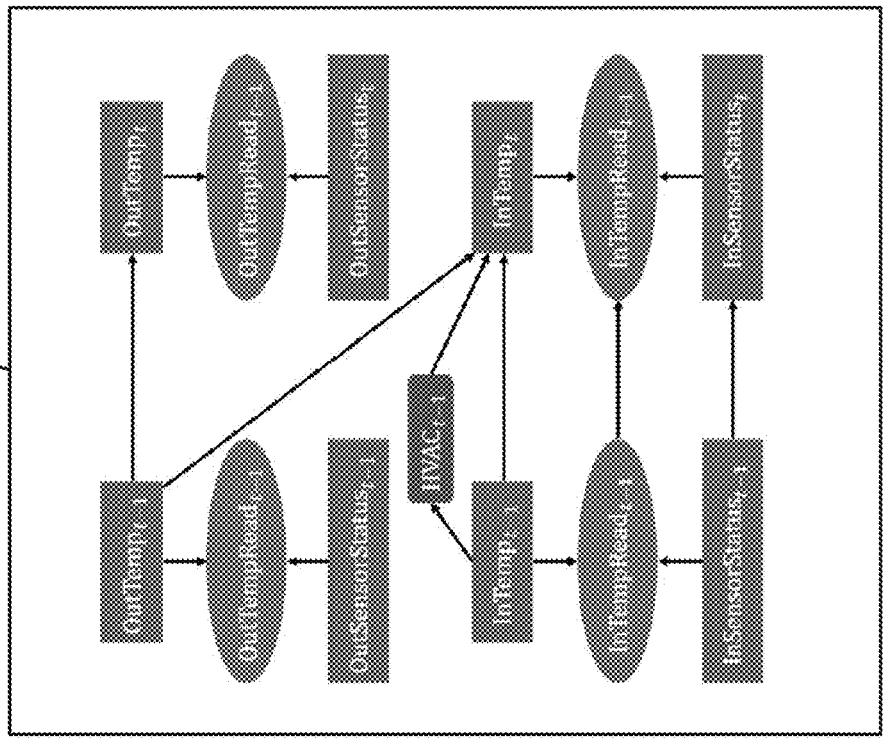
FIG. 16 shows yet another example of a SSM and corresponding program code according to some aspects of the present disclosure.

Each lower-level routine 1318 can be configured to accept a set of arguments and return a result. The lower-level routines 1318 can be defined using a predefined syntax, for example such that the same type of lower-level routine always has the same set of input arguments and returns the same type of result in the same way. One example of the lower-level routine 1318 is shown in FIG. 16. In this example, various properties of a state space model 1602 have been translated into a lower-level routine 1604 named "dbn_samptran." This lower-level routine 1604 has a defined set of input arguments, such as a x, xlag, ylag, z, zlag, theta, and _time. Of course, other examples may involve more, fewer, or different input arguments.

Translating the higher-level program code 1310 into the one or more intermediate-level routines and/or lower-level routines 1318 can involve generating the routines based on the distribution criteria 1312 and the task data 1330. For example, the server system 1304 can execute a code translation engine 1314 to generate the routines based on the distribution criteria 1312, the task data 1330, or both. The code translation engine 1314 can be software configured to access a mapping 1316 that assists in the translation. The mapping 1316 may be stored on the server system 1304, or may be stored elsewhere and accessed by the code translation engine 1314 via the network 1306.

Figure 17:
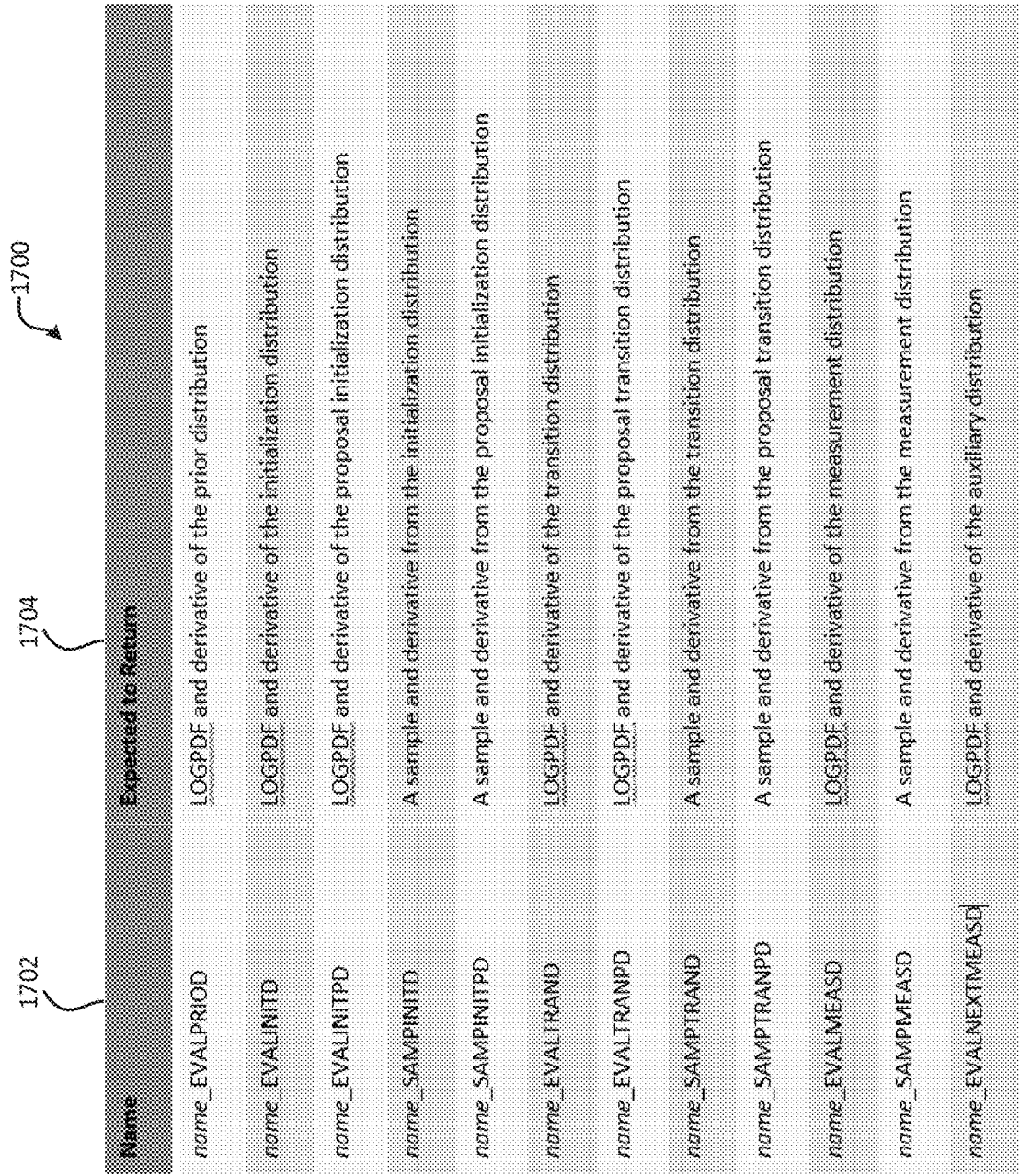
FIG. 17 shows an example of syntax information for a lower-level routine and corresponding program code according to some aspects of the present disclosure.

In some examples, the mapping 1316 can correlate higher-level commands in the higher-level program code 1310 to intermediate-level commands for the intermediate-level routines or lower-level commands for the lower-level routines 1318. Additionally or alternatively, the mapping 1316 can correlate the distribution criteria 1312, task data 1330, or both to said commands. In some examples, the mapping 1316 can correlate the higher-level commands to predefined routine templates, which may be selected and filled in based on the distribution criteria 1312 and/or task data 1330. These predefined routine templates may be "plug and play" templates stored in a repository, where they may have a predefined syntax and structure, and where they can be retrieved from the repository and filled in based on the higher-level program code 1310 and task data 1330. Some examples of such predefined routine templates are shown in the table 1700 of FIG. 17. In this example, the first column 1702 indicates the names of the various routines and the right column 1704 indicates what values the routines are expected to return. Each of the routines may have a defined syntax of input arguments and output values that can be easily "plugged in" to the SMC process. As such, the routines may serve as a type of "virtual API" for the SMC process, in the sense that the SMC process can easily call these routines using their defined syntax (as will be described in detail later on) while the SMC process is executing on the server system 1304. One specific example of a routine is shown in FIG. 18. In this example, the routine is named "evaltran" and its type, requirements, and arguments are defined in the top box 1802. A code implementation of that routine is shown in the lower box 1804.

Continuing with FIG. 13, in some examples the user 1328 can submit higher-level program code 1310 that is converted into intermediate-level program code and then lower-level program code, as noted above. This may help less technical users by allowing them to define their state space models at a relatively high level of abstraction. But more advanced users may wish to simply directly submit the intermediate-level program code or lower-level program code, and the server system 1304 is capable of handling that situation. For example, the user 1328 can directly define the lower-level routines 1318 and provide them to the server system 1304. As a result, one or both of the translation operations may be skipped in such examples.

The server system 1304 can provide an application programming interface 1320 through which the lower-level routines 1318 can be called by a sequential Monte Carlo (SMC) module 1322. The API 1320 can serve as an interface between the lower-level routines 1318 and the SMC module 1322. The SMC module 1322 can call the lower-level routines 1318 as needed by transmitting API commands to the API 1320. Results from executing the lower-level routines 1318 can be provided back to the SMC module 1322 via the API 1320.

The SMC module 1322 can be one of any number of SMC modules 1332 configured to implement different SMC processes. Each of the SMC modules 1332 can be a software module that is executable to implement a particular SMC process that is different from the other SMC processes implemented by the other SMC modules. Some of the SMC processes may be configured to solve different types of problems (e.g., perform different types of tasks) than others of the SMC processes. The server system 1304 may select a particular SMC module 1322 to execute, from among the group of available SMC modules 1332, based on any number and combination of factors. For example, the server system 1304 may select a particular SMC module 1322 based on the distribution criteria 1312 and the task data 1330.

Having selected the appropriate SMC module 1322 (e.g., to solve the particular problem defined in the task data 1330 in relation to the particular SSM associated with the distribution criteria 1312), the server system 1304 can initiate execution of the SMC module 1322. During execution of the SMC process implemented by the SMC module 1322, one or more operations may require use of the lower-level routines 1318. So, the SMC module 1322 can call those lower-level routines 1318 at the appropriate times, for example by issuing corresponding API commands to the API 1320. The lower-level routines 1318 can then execute, with their corresponding results being returned back to the SMC module 1322 via the API 1320 or another mechanism.

In some examples, optimizations may be employed by the server system 1304 to expedite the SMC process. For example, the server system 1304 may use optimization routines 1324 to expedite the SMC process. One example of such an optimization routine 1324 can include forward automatic differentiation. Not only may such optimization routines 1324 expedite processing and reduce consumption of computing resources (e.g., processing power, memory, and storage space), but they can also allow for the use of certain types of SMC processes that otherwise may not be usable at all. This is described in greater detail later on.

Once the SMC module 1322 finishes executing, the net result may be a distribution of values 1334 and a corresponding summary 1336. An example of the distribution 1334 may be a forecasted distribution for a forecasting task. The server system 1304 can transmit that distribution 1334 and/or the summary 1336 back to the client device 1302 via the network 1306 for subsequent use. In this way, the server system 1304 is able to customize the SMC process to fit the state space model and task selected by the user 1328.

Figure 19B:
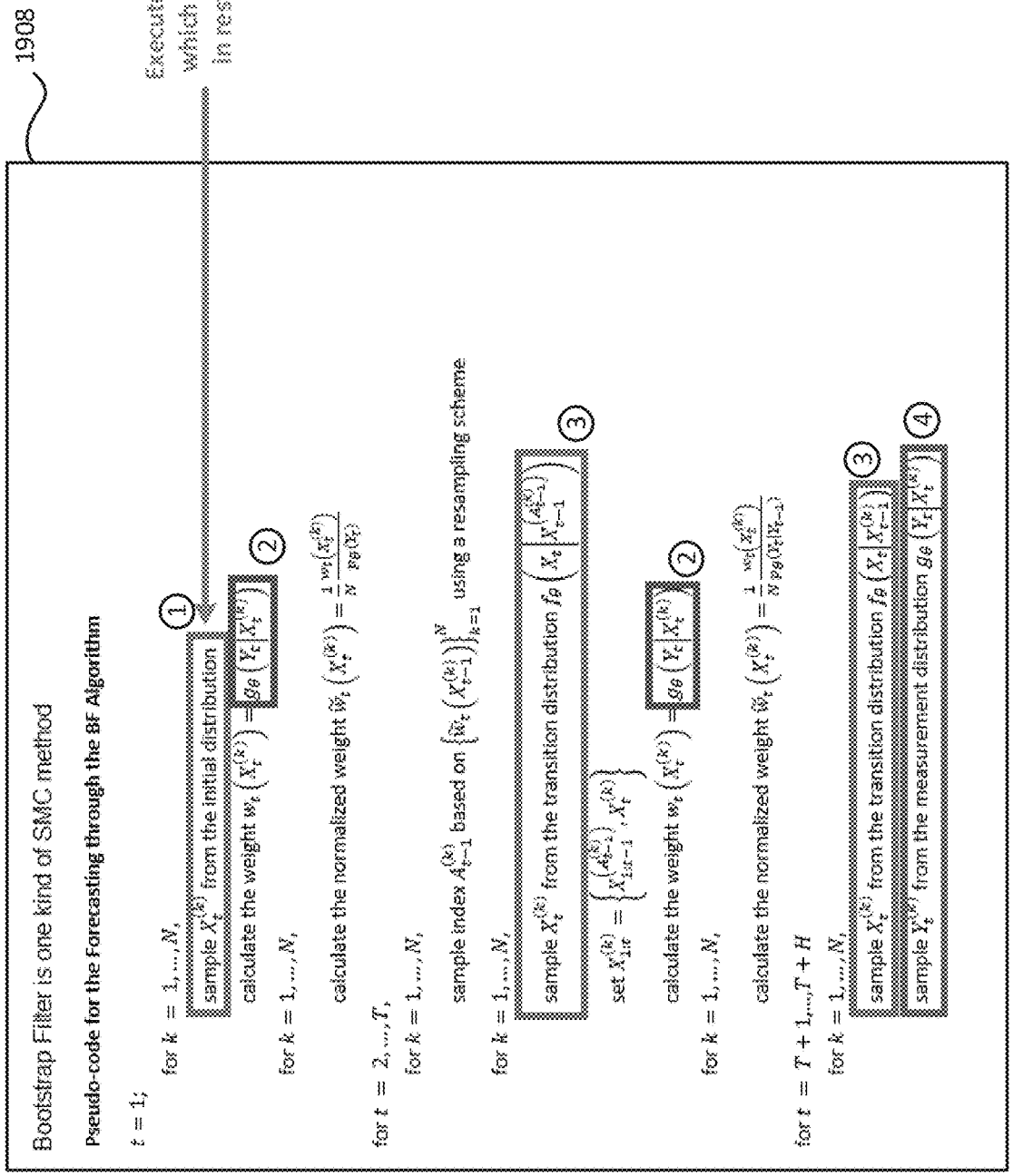

One specific example of the above process is shown in FIGS. 19A-B. In this example, the user wishes to use a stochastic volatility model to predict processor consumption over the next month based on historical data. The historical data includes the last six-month's worth of processor usage metrics. As shown in box 1902, the stochastic volatility model can be characterized using the depicted initial distribution, transition distribution, and measurement distribution. The user, having selected a stochastic volatility model to solve this problem, can next draft the higher-level program code. An example of the higher-level program code is shown in box 1904, where the highlighted code line is a code representation of the initial distribution criteria in box 1902. Next, the higher-level program code in box 1904 can be provided to the server system, which can convert it to the lower-level code shown in box 1906. In particular, the server system can map the "initstate" command in the higher-level code to the lower-level "sampinit" routine and fill out the rest of the routine's code based on the arguments in the "initstate" command.

At a later point in time, the server system may execute an SMC module that is configured to implement a Bootstrap Filter, which is one type of SMC process. Referring now to FIG. 19B, the Bootstrap Filter's algorithm is shown in pseudo code in box 1908. The Bootstrap Filter algorithm involves a number of operations. To execute the operation in box #1, the SMC module can call the "sampinit" routine of FIG. 19A, for example by transmitting an API command the server system's API. The "sampinit" routine can return a result, which can then be used in one or more subsequent operations of the Bootstrap Filter. The other highlighted operations in the Bootstrap Filter may also call other lower-level routines generated in a similar manner as described above. It will be appreciated that over the course of executing one SMC process, there may be multiple API calls issued for multiple different lower-level routines, and each API call may be issued multiple times. For example, in the Bootstrap Filter algorithm shown in box 1908, from the beginning to the end, there are four different types of API calls (e.g., "_SAMPINIT" in box #1, "_EVALMEAS" in box #2, "_SAMPTRAN" in box #3, and "_SAMPMEAS" in box #4) that will be called 2*N*(T+H) times, where T is the sample size, H is the number of forecasts, and N is the number of particles. Each call returns a result that can be used in a subsequent iteration or operation of the Bootstrap Filter algorithm.

Figure 20:
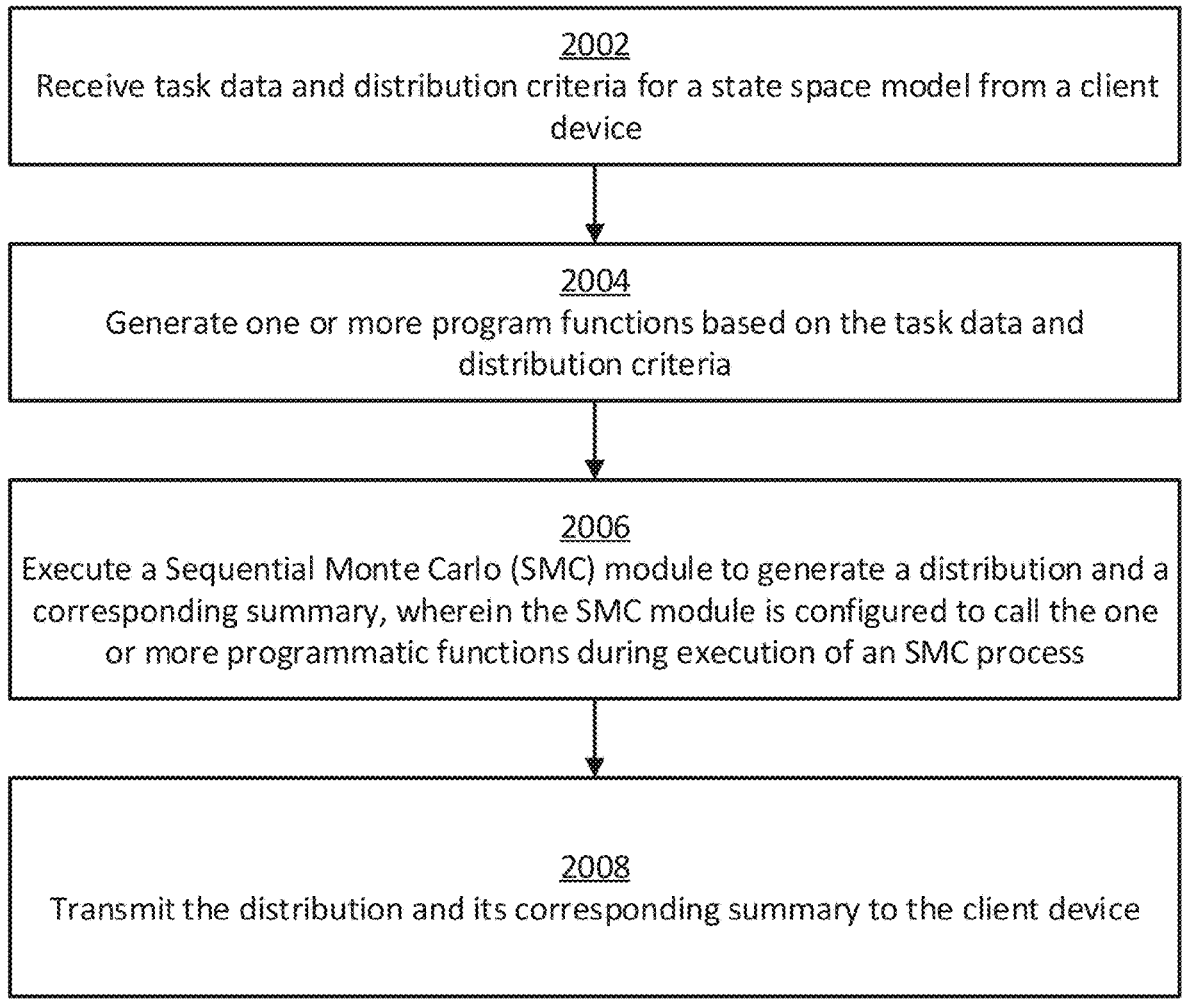
FIG. 20 shows a flow chart of an example of a process for implementing some aspects of the present disclosure.

FIG. 20 is a flowchart showing an example of the process described above according to some aspects. Other examples may involve more operations, fewer operations, or different operations than is shown in FIG. 20. For clarity, the operations of FIG. 20 are described below with reference to the components of FIG. 13 described above.

In block 2002, the server system 1304 receives task data 1330 and higher-level program code 1310 from a client device 1302. The server system 1304 can receive the task data 1330 and the higher-level program code 1310 in one or more electronic communications transmitted from the client device 1302 via the network 1306. The higher-level program code 1310 can include distribution criteria 1312 defining characteristics of a corresponding state space model 1308. Examples of the distribution criteria 1312 can include an initial distribution, a transition distribution, and a measurement distribution associated with the state space model 1308. The task data 1330 can indicate one or more types of SMC tasks to be performed by the server system 1304 relative to the state space model. For example, the task data 1330 can include identifiers of multiple different types of SMC tasks to be performed by the server system 1304. Examples of such tasks include a learning task, a filtering task, a smoothing task, an evaluation task, and a forecasting task.

In block 2004, the server system 1304 generates one or more program functions based on the task data 1330 and the distribution criteria 1312. The program functions can be lower-level routines 1318 that each accept a set of input arguments and return corresponding results. The program functions may be invocable software functions that can be executed by one or more processors of the server system 1304.

To generate the program functions, the server system 1304 can execute a code translation engine 1314. The code translation engine 1314 is software that can be executed by the server system 1304 to generate the program functions based on the higher-level program code 1310 (e.g., the commands and data therein, such as the distribution criteria 1312). In some examples, the code translation engine 1314 may additionally or alternatively generate the program functions based on the task data 1330. The code translation engine 1314 can access one or more predefined mappings 1316 to implement its translation functionality.

In block 2006, the server system 1304 executes a sequential Monte Carlo (SMC) module 1322, which is software formed from executable program code. The server system 1304 can execute the SMC module 1322 to generate a distribution 1334 and a corresponding summary 1336. In some examples, the summary 1336 can include any statistics associated with the sample distribution, such as the mean, standard error, quantiles, or any combination of these. Additional or alternatively, the summary 1336 may include point and interval estimates, diagnostics of the Markov Chain, posterior covariance-matrix data, posterior correlation-matrix data, or any combination of these. The SMC module 1322 is configured to call the program functions during its execution, for example by transmitting corresponding API commands to the API 1320. The SMC module 1322 can receive the results returned from the program functions and apply the results in one or more subsequent steps.

The server system 1304 may select which SMC module to execute, from among a group of available SMC modules 1332, based on the distribution criteria 1312 and/or the task data 1330. In some examples, the server system 1304 may select multiple SMC modules, determine an order in which to execute the SMC modules, and execute them in that order. The server system 1304 may select, and determine the execution order of, the SMC modules based on the distribution criteria 1312 and/or the task data 1330. For example, certain SMC modules may need to be executed before others to obtain reliable results. Additionally or alternatively, certain SMC modules may need to be executed before others based on a sequence of tasks defined in the task data 1330. So, the server system 1304 may determine the appropriate order for the SMC modules and execute them in that order.

In block 2008, the server system 1304 transmits the distribution 1334 and its corresponding summary 1336 to the client device 1302. This may involve transmitting one or more electronic communications that include the distribution and its corresponding summary 1336 to the client device 1302 via the network 1306.

Figure 21:
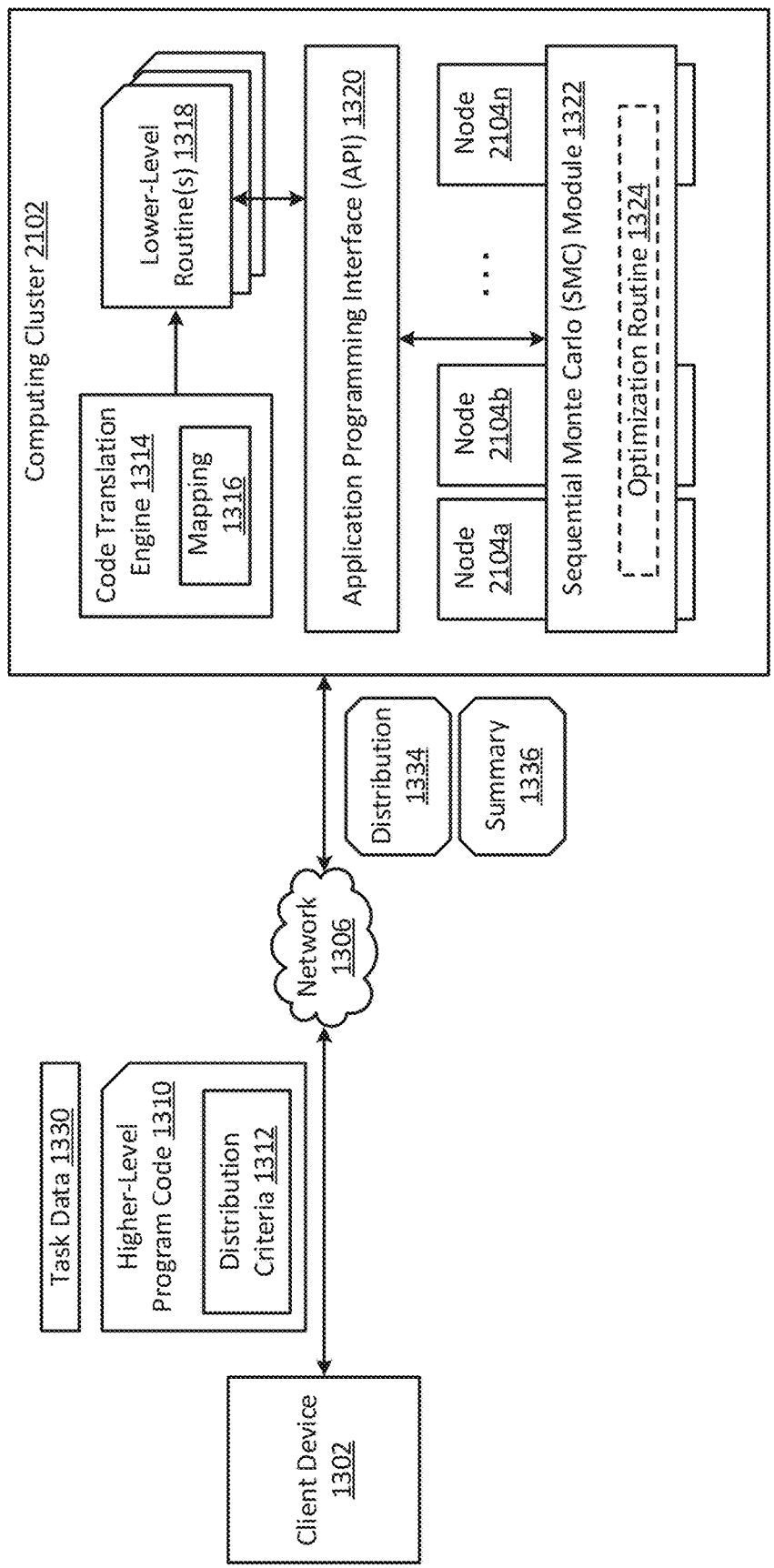
FIG. 21 shows a block diagram of an example of a system involving parallel execution of an SMC process according to some aspects of the present disclosure.

In some examples, the server system can expedite the execution of the SMC process through parallelization. One example of such parallelization is shown in FIG. 21. In this example, the server system includes a computing cluster 2102 formed from any number of computing nodes 2104a-n ("nodes"). The nodes 2104a-n may include hardware nodes, software nodes (e.g., virtual machines), or both of these. In some examples, the computing cluster 2102 can distribute the processing of a selected SMC module 1322 across two or more of the nodes 2104a-n. For example, the computing cluster 2102 can schedule certain software operations of the SMC module 1322 to be processed on one node 2104a and other software operations of the SMC module 1322 to be processed on another node 2104b. In some examples, execution of the SMC module 1322 can be divided among multiple processing threads on the same processor or different processors to improve speed and efficiency.

Other optimizations may also be employed by the system to expedite processing speeds and reduce resource consumption, additionally or alternatively to parallel processing. For example, the server system 1304 may use optimization routines 1324 to expedite the SMC process. Examples of such optimization routines 1324 can include a forward automatic differentiation technique, a Finite Difference technique, an Analytical Differential technique, or any combination thereof. Not only do such optimization routines 1324 expedite processing and reduce consumption of computing resources (e.g., processing power, memory, and storage space), but they can also allow for the use of certain types of SMC processes that otherwise may not be usable at all. For example, Hamiltonian Monte Carlo (HMC), a No-U-Turns-Sampler (NUTS), a Stochastic Gradient Descent optimizer, and other stochastic optimization methods may not be able to be used at all without the optimization routines 1324. Those techniques may not be able to be used without the optimization routines 1324 because they may require gradients to properly function, and such gradients may not be computed without the optimization routines 1324. Thus, using the optimization routines 1324 may not only speed up the server system 1304, but may also expand the total number of SMC process capable of being implemented by the server system 1304. This can increase the system's flexibility and usability.

It is important to note that, despite the advantages described above, traditionally the Finite Difference technique and the Analytical Differential technique have been avoided with respect to SMC processes because they were often thought to be impossible to implement for SMC processes. This is because SMC computations involve a very large amount of random numbers and the code branches depend on those random numbers. In addition, the number of random numbers can also depend on the parameter values. Because of this, it would be too challenging to use the Finite Difference technique alone to get the gradient, because the likelihood difference between two runs might be mainly due to those random numbers but not the difference between the parameter values. It would also be too challenging to use the Analytical Differentiation technique alone to get the gradient, because there are no closed-form equations for the likelihood. But some examples herein can overcome some or all of these problems by using a forward automated differentiation (FAD) technique. The FAD technique can either be used by itself to obtain the gradients, or it can be used in combination with one or both of the other two techniques described above to obtain the gradients. In this way, using the FAD technique can open the door to other optimization routines that have significant value but were previously thought to be unusable in this context.

In particular, the FAD technique uses the chain rule to overcome the random number issue by taking partial derivatives with respect to both the random numbers and the parameters. The FAD technique can be implemented by applying the chain rule to each line of program code in the SMC process. That is, the FAD technique can be directly applied to the program code line-by-line. Although this increases the total number of code lines, that computational increase is more than offset by the speed at which the server system 1304 can converge to a solution as a result of the gradients computed by this optimization routine 1324. This idea can be extended to the implementation of lower-level routines 1318, so that each lower-level routine 1318 can also provide the required derivative information and can thus be integrated with any SMC process (that also calculates the required derivative information using forward automatic differentiation). By using the FAD technique, other types of optimization routines such as the Finite Difference technique and the Analytical Differential technique may also become practical to implement.

The way in which the gradients for the SMC process are computed, and the benefit of doing so, will now be illustrated in the following example. In this example, the users configure the lower-level routines 1318 to compute the gradients, for example by incorporating the forward automatic differentiation code therein. But in other examples, the users may only need to provide the likelihood and sampling calculation without the gradient, and the gradient computation would be automatically executed by the server system 1304.

Figure 23:
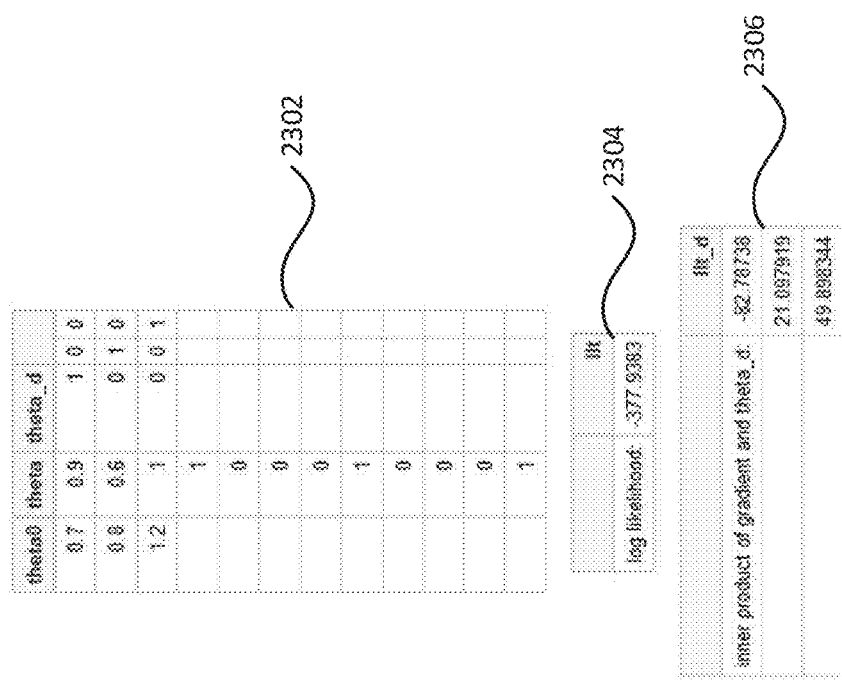
FIG. 23 shows an example of gradient results according to some aspects of the present disclosure.

In this example, a simple SSM is implemented using an SMC process with a gradient computation. FIG. 22 shows a comparison of the code for a lower-level routine 1318 with and without the gradient computation. The left box 2202 is the code without the gradient computation and the right box 2204 is the code with the gradient calculation. By viewing this comparison, it is easy to see how simple it is to apply forward automatic differentiation for the gradient calculation: it mainly involves applying the chain rule for each necessary line of code. This gradient computation computes derivatives in multiple directions. Note that this gradient code can be added by the users, and the simplicity of adding the gradient code can lower the learning curve for the users. For the SMC process (a simple one here), forward automatic differentiation is also applied so that the SMC process could support the gradient computation. Although a bit more complex, this part could be done by the developers associated with the server system, so that the users need not worry about the underlying complex details of the SMC process and its implementation. An example of the gradient results computed using these techniques is shown in FIG. 23. As shown in table 2302, the results can include values for theta0, theta, and theta_d. The results can also include values for a log likelihood, as shown in table 2304. The results can further include an inner product of the gradient and theta_d, as shown in table 2306. Other types of results may also be possible. The gradients and other results computed using the optimization routines can be transmitted back to the client device 1302 of the user 1328, for example as part of the overall results presented to the user 1329 by the server system 1304.

From the above description, it will be appreciated that the system 1300 may be used in any domain and can easily be extended to new SMC process and state space models that focus on any specific domain of interest (e.g., macroeconomics, automation, etc.). Through the optimization routines 1324 (e.g., gradient-based Monte Carlo methods or stochastic optimization methods), some examples herein allow for a larger number of SMC processes to be executed at faster speeds. And by virtue of the flexible lower-level routines and stochastic gradient techniques introduced herein, it becomes possible for a researcher, a practitioner, or a team to build a powerful computer system that can solve SSMs efficiently through SMC processes.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processors; and
one or more memories including program code that is executable by the one or more processors for causing the one or more processors to:
receive task data and a set of program code from a client device, the set of program code comprising distribution criteria for a state space model, the task data indicating one or more types of sequential Monte Carlo (SMC) tasks to be implemented, and the distribution criteria including an initial distribution, a transition distribution, and a measurement distribution for the state space model;
generate a set of program functions based on the task data and the distribution criteria, the set of program functions being configured to receive arguments and return results to facilitate generation of a distribution satisfying the distribution criteria and accomplishing the one or more types of SMC tasks, wherein generating the set of program functions involves translating the set of program code into the set of program functions using a predefined mapping that correlates commands in the set of program code to aspects of the set of program functions;
execute an SMC module to generate the distribution and a corresponding summary, the SMC module including software instructions that are configured to call the set of program functions during execution of an SMC process and apply the results returned from the set of program functions in one or more subsequent steps of the SMC process; and
transmit the distribution and its corresponding summary to the client device.

2. The system of claim 1, wherein the SMC module includes a plurality of SMC modules that are executable in parallel across a plurality of nodes in a computing cluster to collectively implement the SMC process.

3. The system of claim 1, wherein the set of program code is in a first programming language, and wherein the set of program functions are in a second programming language that is different from the first programming language.

4. The system of claim 1, wherein the one or more memories further include program code that is executable by the one or more processors for causing the one or more processors to select the SMC module from among a plurality of SMC modules based on the task data, each SMC module of the plurality of SMC modules being configured to execute a different type of SMC process from the other SMC modules.

5. The system of claim 1, wherein the one or more memories further include program code that is executable by the one or more processors for causing the one or more processors to:
receive a program function from the client device or another client device; and
execute the SMC module, the SMC module being configured to call the program function during execution of the SMC process and apply a result returned from the program function during a subsequent step of the SMC process.

6. The system of claim 1, wherein the SMC module is configured to execute an optimization routine in relation to the SMC process to generate gradients related to the distribution, wherein the one or more memories further include program code that is executable by the one or more processors for causing the one or more processors to transmit the gradients to the client device.

7. The system of claim 6, wherein the optimization routine includes a forward automatic differentiation technique.

8. The system of claim 1, wherein the SMC module is configured to call the set of program functions by transmitting commands to an application programming interface (API), the commands being formatted in accordance with a predefined call syntax that is compatible with the API, and wherein the results are provided to the SMC module from the API in accordance with a predefined return syntax.

9. The system of claim 1, wherein the SMC module is configured to call a plurality of program functions during execution of the SMC process by transmitting a plurality of application programming interface (API) commands to an API, each program function of the plurality of program functions being configured to accept a respective set of arguments included in a respective API command and return a respective result to the SMC process via the API, and each program function of the plurality of program functions being generated based on the task data or the distribution criteria.

10. The system of claim 1, wherein the distribution and the corresponding summary include a posterior distribution and point estimates of unknown parameters for the state space model.

11. The system of claim 1, wherein the distribution and the corresponding summary include a particular distribution of a hidden state in the state space model at a time step, the particular distribution being generated based on a set of data that encompasses a timespan up to that time step.

12. The system of claim 1, wherein the distribution and the corresponding summary include a particular distribution of a hidden state in the state space model at a time step, the particular distribution being generated based on a set of data that encompasses a timespan beyond that time step.

13. The system of claim 1, wherein the distribution and the corresponding summary include a particular distribution of a hidden state in the state space model at a time step, the particular distribution being generated based on a set of data that encompasses a timespan prior to and not including that time step.

14. The system of claim 1, wherein the distribution and the corresponding summary include a particular distribution of a dependent variable associated with the state space model at a time step, the particular distribution being generated based on a set of data that encompasses a timespan prior to and not including that time step.

15. The system of claim 1, wherein the distribution and the corresponding summary indicate a likelihood and gradient for a set of data associated with the state space model.

16. A method comprising:
receiving, by one or more processors, task data and distribution criteria for a state space model from a client device, the task data indicating one or more types of sequential Monte Carlo (SMC) tasks to be implemented, and the distribution criteria including an initial distribution, a transition distribution, and a measurement distribution for the state space model;

generating, by the one or more processors, a set of program functions based on the task data and the distribution criteria, the set of program functions being configured to receive arguments and return results to facilitate generation of a distribution satisfying the distribution criteria and accomplishing the one or more types of SMC tasks;

executing, by the one or more processors, an SMC module to generate the distribution and a corresponding summary, the SMC module including software instructions that are configured to call the set of program functions during execution of an SMC process and apply the results returned from the set of program functions in one or more subsequent steps of the SMC process, wherein the SMC module is configured to call the set of program functions by transmitting commands to an application programming interface (API), the commands being formatted in accordance with a predefined call syntax that is compatible with the API, and wherein the results are provided to the SMC module from the API in accordance with a predefined return syntax; and transmitting, by the one or more processors, the distribution and its corresponding summary to the client device.

17. The method of claim 16, wherein the SMC module includes a plurality of SMC modules that are executable in parallel across a plurality of nodes in a computing cluster to collectively implement the SMC process.

18. The method of claim 16, further comprising:
receive the distribution criteria in a set of program code from the client device; and
translating the set of program code into the set of program functions using a predefined mapping that correlates commands in the program code to aspects of the set of program functions.

19. The method of claim 18, wherein the set of program code is in a first programming language, and wherein the set of program functions are in a second programming language that is different from the first programming language.

20. The method of claim 16, further comprising:
selecting the SMC module from among a plurality of SMC modules based on the task data, each SMC module of the plurality of SMC modules being configured to execute a different type of SMC process from the other SMC modules.

21. The method of claim 16, further comprising:
receiving a program function from the client device or another client device; and
executing the SMC module based on the program function, the SMC module being configured to call the program function during execution of the SMC process and apply a result returned from the program function during a subsequent step of the SMC process.

22. The method of claim 16, wherein the SMC module is configured to execute an optimization routine in relation to the SMC process to generate gradients related to the distribution, and further comprising transmitting the gradients to the client device.

23. The method of claim 22, wherein the optimization routine includes a forward automatic differentiation technique, a finite difference technique, or an analytical differential technique.

24. The method of claim 16, wherein the SMC module is configured to call a plurality of program functions during execution of the SMC process by transmitting a plurality of application programming interface (API) commands to an API, each program function of the plurality of program functions being configured to accept a respective set of arguments included in a respective API command and return a respective result to the SMC process via the API, and each program function of the plurality of program functions being generated based on the task data or the distribution criteria.

25. The method of claim 16, wherein the distribution and the corresponding summary include a posterior distribution and point estimates of unknown parameters for the state space model.

26. The method of claim 16, wherein the distribution and the corresponding summary include a particular distribution of a hidden state in the state space model at a time step, the particular distribution being generated based on a set of data that encompasses a timespan up to that time step.

27. The method of claim 16, wherein the distribution and the corresponding summary include a particular distribution of a hidden state in the state space model at a time step, the particular distribution being generated based on a set of data that encompasses a timespan beyond that time step.

28. A non-transitory computer-readable medium comprising program code that is executable by one or more processors for causing the one or more processors to:
receive task data and distribution criteria for a state space model from a client device, the task data indicating one or more types of sequential Monte Carlo (SMC) tasks to be implemented, and the distribution criteria including an initial distribution, a transition distribution, and a measurement distribution for the state space model;
generate a set of program functions based on the task data and the distribution criteria, the set of program functions being configured to receive arguments and return results to facilitate generation of a distribution satisfying the distribution criteria and accomplishing the one or more types of SMC tasks;
execute an SMC module to generate the distribution and a corresponding summary, the SMC module including software instructions that are configured to call the set of program functions during execution of an SMC process and apply the results returned from the set of program functions in one or more subsequent steps of the SMC process, wherein the SMC module is configured to execute an optimization routine in relation to the SMC process to generate gradients related to the distribution; and
transmit the gradients, the distribution, and the corresponding summary to the client device.

29. A non-transitory computer-readable medium comprising program code that is executable by one or more processors for causing the one or more processors to:
receive task data and distribution criteria for a state space model from a client device, the task data indicating one or more types of sequential Monte Carlo (SMC) tasks to be implemented, and the distribution criteria including an initial distribution, a transition distribution, and a measurement distribution for the state space model;
generate a set of program functions based on the task data and the distribution criteria, the set of program functions being configured to receive arguments and return results to facilitate generation of a distribution satisfying the distribution criteria and accomplishing the one or more types of SMC tasks;
execute an SMC module to generate the distribution and a corresponding summary, the SMC module including software instructions that are configured to call the set of program functions during execution of an SMC process and apply the results returned from the set of program functions in one or more subsequent steps of the SMC process,
wherein the distribution and the corresponding summary include a particular distribution of a hidden state in the state space model at a time step, the particular distribution being generated based on a set of data that encompasses a timespan up to the time step, up to and not including the time step, or beyond the time step; or
wherein the distribution and the corresponding summary include a particular distribution of a dependent variable associated with the state space model at a time step, the particular distribution being generated based on a set of data that encompasses a timespan prior to and not including the time step; and
transmit the distribution and the corresponding summary to the client device.

30. The method of claim 16, wherein the distribution and the corresponding summary include a particular distribution of a hidden state in the state space model at a time step, the particular distribution being generated based on a set of data that encompasses a timespan prior to and not including that time step.

* * * * *